US007580045B2

(12) United States Patent
Harrison et al.

(10) Patent No.: US 7,580,045 B2
(45) Date of Patent: *Aug. 25, 2009

(54) LAND SOFTWARE TOOL

(75) Inventors: Craig D. Harrison, Fort Collins, CO (US); James J. Graham, Fort Collins, CO (US)

(73) Assignee: Landnet Corporation, Loveland, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/028,729

(22) Filed: Feb. 8, 2008

(65) Prior Publication Data

US 2008/0130955 A1    Jun. 5, 2008

Related U.S. Application Data

(63) Continuation of application No. 11/339,267, filed on Jan. 24, 2006, now Pat. No. 7,356,406, which is a continuation of application No. 10/365,718, filed on Feb. 11, 2003, now Pat. No. 7,054,741.

(60) Provisional application No. 60/356,405, filed on Feb. 11, 2002.

(51) Int. Cl.
*G09G 5/00* (2006.01)
*G01C 21/30* (2006.01)

(52) U.S. Cl. .................. 345/628; 701/208; 715/764

(58) Field of Classification Search .............. 701/208; 715/764; 345/628

See application file for complete search history.

(56) References Cited

U.S. PATENT DOCUMENTS 4,661,811 A    4/1987   Gray (Continued)

OTHER PUBLICATIONS www.landviewer.com.
www.mapquest.com.
www.globeexplorer.com.

(Continued)

*Primary Examiner*—Kee M Tung
*Assistant Examiner*—Michelle K Lay
(74) *Attorney, Agent, or Firm*—William W. Cochran; Christopher P. Whitham; Cochran Freund & Young LLC

(57) ABSTRACT

Disclosed is a network accessible tool that is capable of providing map and satellite image data, as well as other photographic image data to locate, identify, measure, view, and communicate information about land over the Internet-to-Internet users. The network accessible tool includes a location tool that allows the user to locate areas on a map using geographic names, township, range and section descriptions, county names, latitude and longitude coordinates or zip codes. Network accessible tool also includes a metes and bounds tool that draws boundaries on the map and image data in response to metes and bounds descriptions that have been entered by the Internet user. The network accessible tool also includes a lat/long drawing tool that draws boundaries on the map and image data based upon latitude and longitude coordinate pairs that have been entered by the Internet user. A cursor drawing tool allows the Internet user to draw and edit boundaries on the map and image data by simply clicking the cursor on the corner points of the boundary. An acreage calculation tool is also provided that calculates the acreage of an enclosed boundary. A distance measurement tool is also provided. The cursor information tool provides information relating to the name and creation date of the map and image data in accordance with the location of the cursor on the screen. The information can be communicated by printing, downloading, or e-mailing.

66 Claims, 20 Drawing Sheets

U.S. PATENT DOCUMENTS

| | | | |
|---|---|---|---|
| 4,870,576 A | 9/1989 | Tornetta | |
| 4,873,513 A | 10/1989 | Soults et al. | |
| 5,032,989 A | 7/1991 | Tornetta | |
| 5,337,242 A | 8/1994 | Yamamoto et al. | |
| 5,359,526 A | 10/1994 | Whittington et al. | |
| 5,414,462 A | 5/1995 | Veatch | |
| 5,418,906 A | 5/1995 | Berger | |
| 5,422,814 A | 6/1995 | Sprague et al. | |
| 5,475,802 A | 12/1995 | Wescott et al. | |
| 5,544,052 A | 8/1996 | Fujita et al. | |
| 5,664,115 A | 9/1997 | Fraser | |
| 5,680,305 A | 10/1997 | Apgar, IV | |
| 5,736,977 A | 4/1998 | Hughes | |
| 5,751,612 A | 5/1998 | Donovan et al. | |
| 5,771,169 A | 6/1998 | Wendte | |
| 5,781,773 A | 7/1998 | Vanderpool et al. | |
| 5,794,216 A | 8/1998 | Brown | |
| 5,852,810 A | 12/1998 | Sotiroff et al. | |
| 5,890,088 A | 3/1999 | Nimura et al. | |
| 5,978,747 A | 11/1999 | Craport et al. | |
| 6,085,135 A | 7/2000 | Steckel | |
| 6,105,134 A | 8/2000 | Pinder et al. | |
| 6,121,970 A | 9/2000 | Guedalia | |
| 6,182,127 B1 | 1/2001 | Cronin et al. | |
| 6,218,965 B1 | 4/2001 | Gendron et al. | |
| 6,229,546 B1 | 5/2001 | Lancaster et al. | |
| 6,236,907 B1 | 5/2001 | Hauwiller et al. | |
| 6,247,019 B1 | 6/2001 | Davies | |
| 6,263,343 B1 * | 7/2001 | Hirono | 707/104.1 |
| 6,307,573 B1 | 10/2001 | Barros | |
| 6,314,370 B1 | 11/2001 | Curtright | |
| 6,320,599 B1 | 11/2001 | Sciammarella et al. | |
| 6,321,158 B1 | 11/2001 | DeLorme et al. | |
| 6,336,074 B1 | 1/2002 | Woo | |
| 6,356,283 B1 | 3/2002 | Guedailia | |
| 6,366,294 B1 | 4/2002 | Cunningham et al. | |
| 6,377,210 B1 | 4/2002 | Moore | |
| 6,397,144 B2 | 5/2002 | Ikeuchi et al. | |
| 6,421,610 B1 | 7/2002 | Carroll et al. | |
| 6,434,258 B2 | 8/2002 | Wiens | |
| 6,442,483 B1 | 8/2002 | Doglione | |
| 6,493,633 B2 | 12/2002 | Baron et al. | |
| 6,525,732 B1 | 2/2003 | Gadh et al. | |
| 6,606,542 B2 | 8/2003 | Hauwiller et al. | |
| 6,650,998 B1 | 11/2003 | Rutledge et al. | |
| 6,708,309 B1 | 3/2004 | Blumberg | |
| 6,834,252 B2 | 12/2004 | Yokota | |
| 6,873,998 B1 | 3/2005 | Dorum et al. | |
| 7,007,228 B1 | 2/2006 | Carro | |
| 7,054,741 B2 | 5/2006 | Harrison | |
| 7,171,389 B2 | 1/2007 | Harrison | |
| 7,356,406 B2 | 4/2008 | Harrison | |
| 2001/0026271 A1 | 10/2001 | Higgins et al. | |
| 2001/0030667 A1 | 10/2001 | Kelts | |
| 2001/0051960 A1 | 12/2001 | Kubick et al. | |
| 2002/0000999 A1 | 1/2002 | McCarty | |
| 2002/0035432 A1 | 3/2002 | Kubica et al. | |
| 2002/0060734 A1 * | 5/2002 | Hino et al. | 348/144 |
| 2002/0067353 A1 | 6/2002 | Kenyon et al. | |
| 2002/0067374 A1 | 6/2002 | Kenyon | |
| 2002/0067379 A1 | 6/2002 | Kenyon | |
| 2002/0072850 A1 | 6/2002 | McClure | |
| 2002/0075323 A1 | 6/2002 | O'Dell | |
| 2002/0091758 A1 | 7/2002 | Singh et al. | |
| 2002/0122564 A1 | 9/2002 | Rhoads et al. | |
| 2003/0182052 A1 | 9/2003 | DeLorme et al. | |
| 2005/0116966 A1 | 6/2005 | Harrison et al. | |
| 2007/0112936 A1 | 5/2007 | Harrison | |
| 2007/0226004 A1 | 9/2007 | Harrison | |

OTHER PUBLICATIONS www.pixxures.com.
www.terraserver.com.
Non-Final Office Action, mailed Mar. 4, 2009, in U.S. Appl. No. 11/621,515, filed Jan. 9, 2007, by Craig Harrison.
Non-Final Office Action, mailed Mar. 24, 2006, in U.S. Appl. No. 10/162,723, filed Jun. 3, 2002, by Craig Harrison.
Non-Final Office Action, mailed Feb. 9, 2005, in U.S. Appl. No. 10/162,723, filed Jun. 3, 2002, by Craig Harrison.
Non-Final Office Action, mailed Sep. 25, 2007, in U.S. Appl. No. 11/339,267, filed Jan. 24, 2006, by Craig Harrison.
Non-Final Office Action, mailed Mar. 24, 2005, in U.S. Appl. No. 10/365,718, filed Feb. 11, 2003, by Craig Harrison.
U.S. Appl. No. 11/383,729, filed May 16, 2006, by Craig Harrison.
U.S. Appl. No. 10/408,757, filed Apr. 3, 2003, by Craig Harrison.
U.S. Appl. No. 11/621,515, filed Jan. 9, 2007, by Craig Harrison.
U.S. Appl. No. 11/750,874, filed May 18, 2007, by Craig Harrison.

* cited by examiner

Enter the latitude/longitude coordinates for each point in your boundary below.
You may enter decimal degrees instead of degrees, minutes and seconds.
Example: 40°36' 40" is equivalent to 40.61111111

1: Latitude:  [40]  degrees  [41]  minutes  [59.70]  seconds ⎫
   Longitude: [106] degrees  [19]  minutes  [23.90]  seconds ⎭ 1004

2: Latitude:  [40]  degrees  [42]  minutes  [0.48]   seconds ⎫
   Longitude: [106] degrees  [22]  minutes  [15.77]  seconds ⎭ 1006

3: Latitude:  [40]  degrees  [39]  minutes  [47.20]  seconds ⎫
   Longitude: [106] degrees  [21]  minutes  [51.10]  seconds ⎭ 1008

4: Latitude:  [40]  degrees  [39]  minutes  [52.15]  seconds ⎫
   Longitude: [106] degrees  [18]  minutes  [44.84]  seconds ⎭ 1010

[Draw Boundary] ~1012   [Cancel] ~1014   [Print] ~1016   [Help] ~1018

Step 4. Enter the following for each of the courses after the point of true beginning below 1: [South ▼] [85.0] degrees [57.0] minutes [14.10] seconds [West ▼] [2371.39] feet ←1102

2: [South ▼] [2.0] degrees [1.0] minutes [16.91] seconds [East ▼] [2790.45] feet ←1104

3: [South ▼] [87.0] degrees [32.0] minutes [8.25] seconds [East ▼] [2594.26] feet ←1106

4: [North ▼] [2.0] degrees [17.0] minutes [0.92] seconds [East ▼] [2140.80] feet ←1108

[Continue] 1110   [Cancel] 1112   [Print] 1114   [Help] 1116

LAND SOFTWARE TOOL

CROSS REFERENCE TO RELATED APPLICATIONS

This application is a continuation of U.S. patent application Ser. No. 11/339,267, entitled "Land Software Tool," filed on Jan. 24, 2006 now U.S. Pat. No. 7,356,406 by Craig D. Harrison and James J. Graham, which was a continuation of U.S. patent application Ser. No. 10/365,718, entitled "Land Software Tool," filed on Feb. 11, 2003 now U.S. Pat. No. 7,054,741 by Craig D. Harrison and James J. Graham, which was based upon and claims the benefit of U.S. Provisional Patent Application Ser. No. 60/356,405 by Craig D. Harrison entitled "An Internet Delivered and Accessible Set of Maps, Images, and Tools for Locating, Identifying, Measuring, Viewing, and Communicating Information about Land and Areas of Land" filed Feb. 11, 2002, the entire contents of all referenced applications are hereby specifically incorporated by reference for all they disclose and teach.

BACKGROUND OF THE INVENTION

Map and image data, including satellite data and aerial photographic data, which is hereinafter referred to as maps, map information, map data and includes any type of image data, have been provided through various databases and mass storage devices such as CD/ROMs. However, a comprehensive set of tools that work together in a synergistic fashion have not been provided with extensive functionality for locating, identifying, measuring, viewing and communicating such data in a simple and easy to use tool that operates over the Internet, intranets, wireless connections or any desired network (otherwise referred to as a "network") using standard browsers and e-mail tools.

Therefore, a need exists for such a network accessible tool that provides these and other functions.

SUMMARY OF THE INVENTION

An embodiment of the present invention may comprise a method of obtaining map identification information relating to a specific map in a set of digital maps in response to the location of a cursor comprising: performing the method of obtaining the map identification information relating to the specific map in the set of digital maps in response to the location of the cursor using an Internet accessible software tool; determining coordinates of the cursor on a screen displaying the set of digital maps by counting pixels from an origin point; converting cursor screen coordinates to cursor geographic coordinates; locating a correct row for the specific map in a plurality of rows of the set of digital maps by comparing the cursor geographic coordinates with minimum and maximum values of the plurality of rows; locating a correct proximity location of the specific map by comparing the cursor geographic coordinates with minimum and maximum proximity values of maps in the correct row; identifying the specific map by comparing the cursor geographic coordinates with map polygons for maps located in the correct proximity location; retrieving stored map identification information relating to the specific map; and using the stored map identification information as a repository for the map identification information to perform investigatory functions relating to the specific map.

An embodiment of the present invention may further comprise a method of obtaining map identification information relating to a specific map in a set of digital maps in response to the location of a cursor comprising: performing the method of obtaining the map identification information relating to the specific map in the set of digital maps in response to the location of the cursor using an Internet accessible software tool; determining coordinates of the cursor on a screen displaying the set of digital maps by counting pixels from an origin point; converting cursor screen coordinates to cursor geographic coordinates; locating a correct row for the specific map in a plurality of rows of the set of digital maps by comparing the cursor geographic coordinates with minimum and maximum values of the plurality of rows; locating a correct proximity location of the specific map by comparing the cursor geographic coordinates with minimum and maximum proximity values of maps in the correct row; identifying the specific map by comparing the cursor geographic coordinates with map polygons for maps located in the correct proximity location; retrieving stored map identification information relating to the specific map; and updating the stored map identification information relating to the specific map identified by the cursor screen coordinates as the cursor screen coordinates change due to the cursor being moved.

An embodiment of the present invention may further comprise a method of obtaining map identification information relating to a specific map in a set of digital maps in response to the location of a cursor comprising: performing the method of obtaining the map identification information relating to the specific map in the set of digital maps in response to the location of the cursor using an Internet accessible software tool; determining coordinates of the cursor on a screen displaying the set of digital maps by counting pixels from an origin point; converting cursor screen coordinates to cursor geographic coordinates; locating a correct row for the specific map in a plurality of rows of the set of digital maps by comparing the cursor geographic coordinates with minimum and maximum values of the plurality of rows; locating a correct proximity location of the specific map by comparing the cursor geographic coordinates with minimum and maximum proximity values of maps in the correct row; identifying the specific map by comparing the cursor geographic coordinates with map polygons for maps located in the correct proximity location; and retrieving stored map identification information relating to the specific map, wherein the stored map identification information comprises at least one of the group consisting of: map dates, image dates, map names, image names, and other map data.

An embodiment of the present invention may further comprise a method of obtaining land description data relating to land described by a specific map in a set of digital maps in response to the location of a cursor comprising: performing the method of obtaining the land description data relating to the specific map in the set of digital maps in response to the location of the cursor using an Internet accessible software tool; determining coordinates of the cursor on a screen displaying the set of digital maps by counting pixels from an origin point; converting cursor screen coordinates to cursor geographic coordinates; locating a correct row for the specific map in a plurality of rows of the set of digital maps by comparing the cursor geographic coordinates with minimum and maximum values of the plurality of rows; locating a correct proximity location of the specific map by comparing the cursor geographic coordinates with minimum and maximum proximity values of maps in the correct row; identifying the specific map by comparing the cursor geographic coordinates with map polygons for maps located in the correct proximity location; and retrieving the land description data described by the specific map.

An embodiment of the present invention may further comprise a method of obtaining map description data relating to a specific map in a set of digital maps in response to the location of a cursor comprising: performing the method of obtaining the map description data relating to the specific map in the set of digital maps in response to the location of the cursor using an Internet accessible software tool; determining coordinates of the cursor on a screen displaying the set of digital maps by counting pixels from an origin point; converting cursor screen coordinates to cursor geographic coordinates; locating a correct row for the specific map in a plurality of rows of the set of digital maps by comparing the cursor geographic coordinates with minimum and maximum values of the plurality of rows; locating a correct proximity location of the specific map by comparing the cursor geographic coordinates with minimum and maximum proximity values of maps in the correct row; identifying the specific map by comparing the cursor geographic coordinates with map polygons for maps located in the correct proximity location; and retrieving stored map description data relating to the specific map.

An embodiment of the present invention may further comprise a method of obtaining location description data relating to a specific map in a set of digital maps in response to the location of a cursor comprising: performing the method of obtaining the location description data relating to the specific map in the set of digital maps in response to the location of the cursor using an Internet accessible software tool; determining coordinates of the cursor on a screen displaying the set of digital maps by counting pixels from an origin point; converting cursor screen coordinates to cursor geographic coordinates; locating a correct row for the specific map in a plurality of rows of the set of digital maps by comparing the cursor geographic coordinates with minimum and maximum values of the plurality of rows; locating a correct proximity location of the specific map by comparing the cursor geographic coordinates with minimum and maximum proximity values of maps in the correct row; identifying the specific map by comparing the cursor geographic coordinates with map polygons for maps located in the correct proximity location; and retrieving the location description data relating to the specific map.

An embodiment of the present invention may further comprise a method of obtaining e-documents relating to a specific map in a set of digital maps in response to the location of a cursor comprising: performing the method of obtaining the e-documents relating to land described by the specific map in the set of digital maps in response to the location of the cursor using an Internet accessible software tool; determining coordinates of the cursor on a screen displaying the set of digital maps by counting pixels from an origin point; converting cursor screen coordinates to cursor geographic coordinates; locating a correct row for the specific map in a plurality of rows of the set of digital maps by comparing the cursor geographic coordinates with minimum and maximum values of the plurality of rows; locating a correct proximity location of the specific map by comparing the cursor geographic coordinates with minimum and maximum proximity values of maps in the correct row; identifying the specific map by comparing the cursor geographic coordinates with map polygons for maps located in the correct proximity location; and retrieving stored e-documents relating to the land described by the specific map.

An embodiment of the present invention may further comprise a method of locating a boundary on a plurality of digital maps and images comprising: performing the method of locating the boundary on the plurality of digital maps and images using an Internet accessible software tool; obtaining a first digital map with the boundary overlaid on the first digital map, wherein the boundary is comprised of a plurality of boundary points delineating screen coordinates of the boundary on the first digital map; analyzing the screen coordinates of the plurality of boundary points; generating geographic coordinates for the plurality of boundary points in response to analysis of the screen coordinates; generating lines between the geographic coordinates of the plurality of boundary points to produce boundary lines of the boundary; displaying the boundary lines; displaying the plurality of boundary points and the boundary lines at corresponding geographic locations on additional digital maps and images; toggling between the additional digital maps and images to view the location of the plurality of boundary points and the boundary lines on the additional digital maps and images; and adjusting the location of the plurality of boundary points, as needed, to accurately locate the plurality of boundary points on the first digital map and the additional digital maps and images.

An embodiment of the present invention may further comprise a method of locating a boundary point on a plurality of digital maps and images comprising: performing the method of locating the boundary point on the plurality of digital maps and images using an Internet accessible software tool; obtaining a first digital map with the boundary point overlaid on the first digital map, wherein the boundary point has screen coordinates on the first digital map; analyzing the screen coordinates of the boundary point; generating geographic coordinates for the boundary point in response to analysis of the screen coordinates; displaying the boundary point at a corresponding geographic location on additional digital maps and images; toggling between the additional digital maps and images to view the location of the boundary point on the additional digital maps and images; and adjusting the location of the boundary point, as needed, to accurately locate the boundary point on the first digital map and the additional digital maps and images.

An embodiment of the present invention may further comprise a method of generating a boundary on a digital map using a cursor comprising: performing the method of generating the boundary on the digital map using the cursor using an Internet accessible software tool; generating an initial boundary point by activation of the cursor at an initial location on the digital map by clicking a mouse; analyzing screen coordinates of the initial boundary point; generating geographic coordinates for the initial boundary point in response to analysis of the screen coordinates; drawing the boundary from the initial boundary point using a drawing tool; analyzing screen coordinates of the boundary drawn by the drawing tool; generating additional boundary points for the boundary in response to analysis of the boundary drawn by the drawing tool; analyzing screen coordinates of the additional boundary points; generating geographic coordinates for the additional boundary points; and generating boundary lines between the geographic coordinates of the initial and additional boundary points.

An embodiment of the present invention may further comprise a method of using an Internet accessible tool to generate a boundary on a digital map using a cursor comprising: generating an initial boundary point using the Internet accessible tool by activation of the cursor at an initial location on the digital map by clicking a mouse; analyzing screen coordinates of the initial boundary point; generating geographic coordinates for the initial boundary point in response to analysis of the screen coordinates; generating additional boundary points by activation of the cursor at additional locations on the digital map by clicking a mouse; analyzing screen coordinates of the additional boundary points; generating geographic coordinates for the additional boundary points; generating lines between the geographic coordinates of the initial and additional boundary points; and providing access to the method of using an Internet accessible tool to generate a boundary on a digital map using a cursor to a user over an Internet connection for a fee.

An embodiment of the present invention may further comprise a method for providing Internet access to digital geographic mapping to a user comprising: making an Internet connection to a host computer, the host computer containing digital geographic mapping tools; providing access to the digital geographic mapping tools over the Internet connection to the user for a fee.

An embodiment of the present invention may further comprise a method of generating a boundary on a digital map using geographic coordinates of a plurality of corner points of the boundary comprising: generating a geographic coordinates table; entering the geographic coordinates of the plurality of corner points of the boundary in the geographic coordinates table; locating coordinates of the plurality of corner points of the boundary on the digital map by reference to an origin point, the coordinates corresponding to adjacent geographic coordinates; generating lines between the coordinates to display the boundary on the digital map; and performing the method of generating the boundary on the digital map using the geographic coordinates of the plurality of corner points of the boundary using an Internet accessible software tool.

BRIEF DESCRIPTION OF THE DRAWINGS

In the drawings,

FIG. 10 is an illustration of a table of latitude/longitude coordinate pairs.

FIG. 11 is a table illustrating distance and direction information used in a metes and bounds description.

DETAILED DESCRIPTION OF THE INVENTION

Figure 1A:
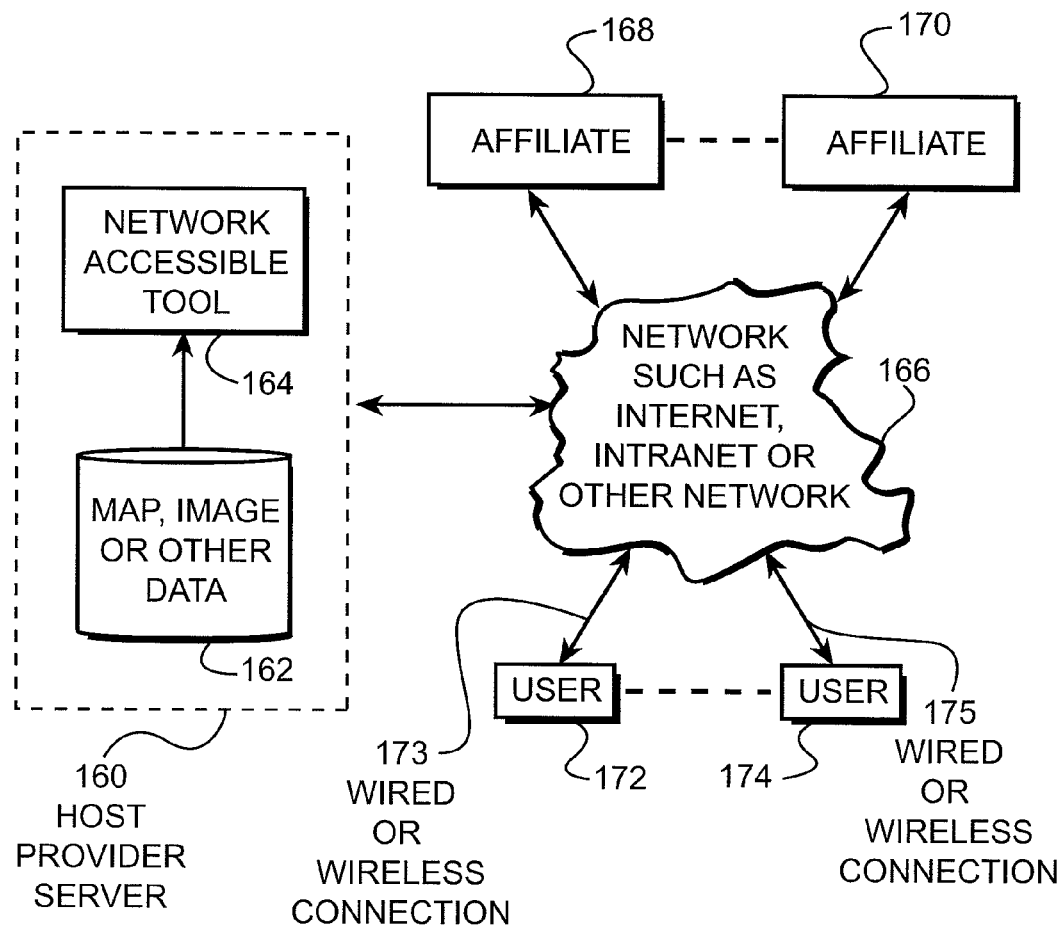
FIG. 1a is a schematic block diagram of a system for implementing the present invention.

FIG. 1a discloses the manner in which the network accessible tool 164 is employed in accordance with the present invention. As shown in FIG. 1a, a host provider server 160 is established that includes the network accessible tool 164 and map, image and other data 162. A storage medium stores computer code for the network accessible tool to encode a computer system. Computer code, such as the computer code for the network accessible tool, is generally understood to provide instructions for a computer system, such as the host provider server, to perform various processes. To encode a computer system with the computer code of the network accessible tool stored on the storage medium, the storage medium is readable by the computer system. That is, the storage medium is a computer readable storage medium. As described in the disclosure with respect to various drawings herein (e.g., FIGS. 1b, 4, 5 and 6), the network accessible tool has various "tools" incorporated into the network accessible tool that provide various different functionalities. The cursor drawing tool (see disclosure with respect to FIG. 6 for additional information) and the metes and bounds tool (see disclosure with respect to FIG. 4 for additional information) are two examples of "tool" functionality incorporated into the network accessible tool. The host provider server 160 is connected to a network 166 such as the Internet, WAN, LAN or other network via wired or wireless connections 173, 175 to allow any number of users 172, 174 that are connected to the network 166 to have access to the host provider server 160. In addition, a number of affiliates 168, 170 may also be connected to the network 166. Users 172, 174 may select a link when logged onto an affiliate website, which links the user into the host provider server 160. This link may be provided by a button on the affiliate's website, as disclosed above, such as "Print a Free Map of Your Land" or other promotional item. For example, for affiliates involved in land finance, appraisal and transactions, a "Free Map of Your 1031 Land," a "Free Map of Your Acreage," and a "Free Map of Your Collateral" may be provided. For affiliates that are involved in agriculture, a "Free Map of Your Center Point" may be used. For affiliates that are associated with natural resources, a "Free Map of Your Timber," a "Free Map of Your Wetland," a "Free Map of Your Watershed," a "Free Map of Your Water Rights," and a "Free Map of Your Wild Fire" may be provided. For affiliates involved in land conservation, other free map promotions may be indicated, such as a "Free Map of Your Conservation" and a "Free Map of Your Environmental Audit." For land engineering affiliates, promotions may be provided such as a "Free Map of Your Survey," a "Free Map of Your Project Area," and a "Free Map of Your Land Site." For affiliates involved in land leases, promotions such as a "Free Map of Your Mineral Lease" and a "Free Map of Your State Lease" may be provided. For affiliates involved in land titles, promotions such as a "Free Map of Your Easement," a "Free Map of Your Subject Property," and a "Free Map of Your Right-of-Way" may be provided.

These promotional concepts aid in the marketing and distribution of the use of the network accessible tool. Other promotional techniques are also employed by the network accessible tool. The network accessible tool 164 provides various functionality to generate a graphic user interface of the image data 162 relating to land. The network accessible tool 164 provides a myriad of functions and services that allow the users 172, 174 to locate, view, store, and transmit map, satellite, photographic and other data relating to land. The map and other image data, as explained below, consists of various sets of map and image data in a digitized form that provides a seamless view of large areas of land that can be used for various purposes, as explained in more detail below.

Each piece of land is different. There are no two parcels of land that are exactly alike. The commonality is that every parcel of land or area of land can be defined with a boundary. Besides the physical and political aspects of each parcel of land being different, so is its size and shape and distance from another area of interest. Each piece then differs based on its topography, elevation, natural features and physical features, etc. There has never before been a tool which provides a combined method to locate, identify, measure, view, and communicate information about land with the total overall ease of use and comprehensiveness as the present invention.

Figure 1B:
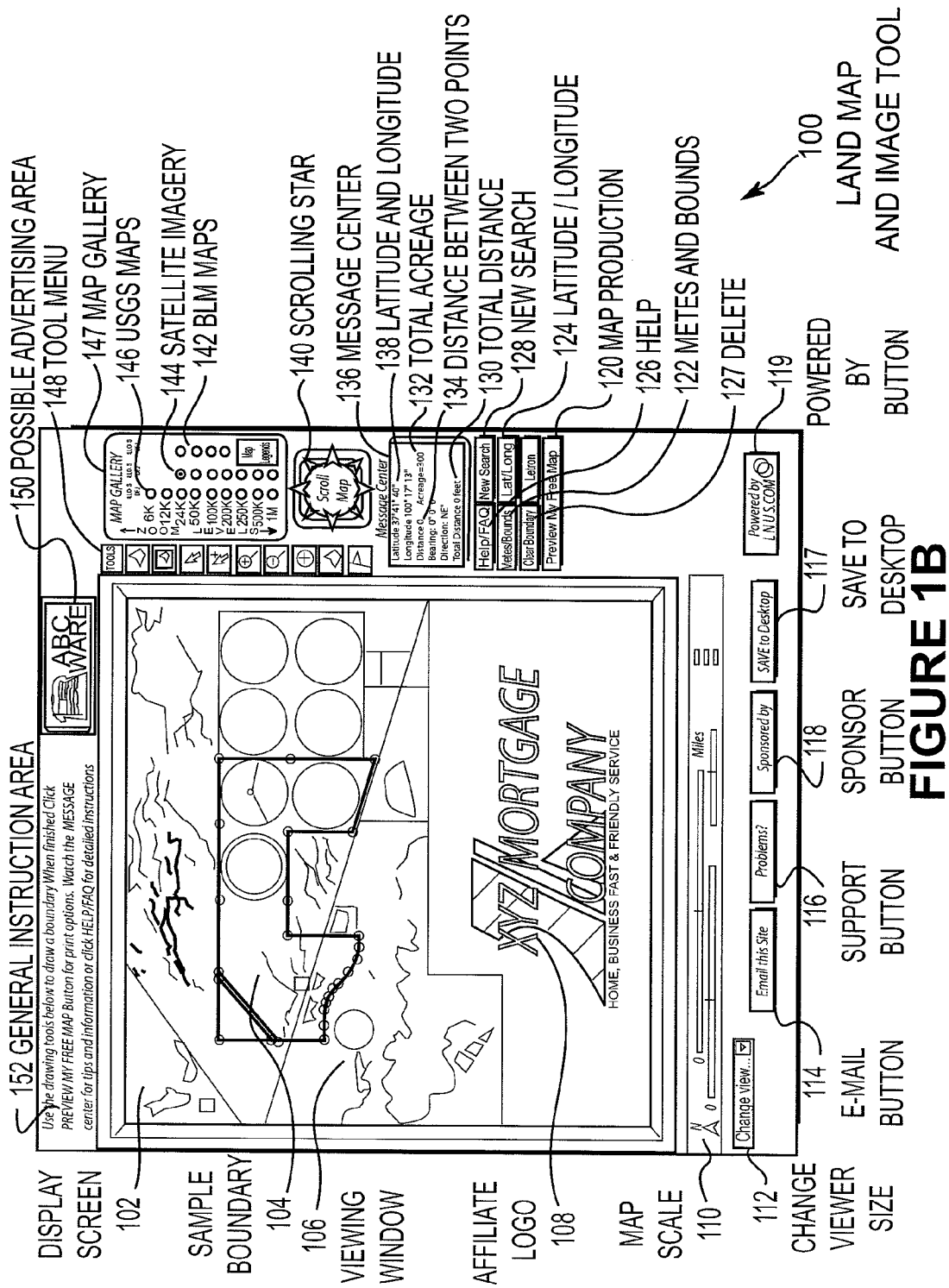
FIG. 1b is a schematic representation of the graphic user interface display of the network accessible tool of the present invention.

FIG. 1*b* is an illustration of the graphic user interface of an implementation of a network accessible tool 164 of the present invention that is capable of displaying information relating to land. As shown in FIG. 1*b*, the graphic user interface 100 of the tool 164 includes a display screen area 102 for displaying map, satellite, photographic and other image data relating to land. The display area 102 also displays affiliate information such as a logo 108 of an affiliate. This may occur, for example, when the map, satellite or other photographic data is being rewritten on the screen. For example, if a user of the network accessible tool 164 toggles to satellite data, changes scales of map data, or switches to photographic data, the viewing window 106 is written onto the display screen 102 over the affiliate identifying information, such as the affiliate logo 108. Sample boundary information 104 can be entered by a user by various methods. For example, a metes and bounds tool 122 can be used that is a part of the network accessible tool 164 that allows the user to enter metes and bounds data. Boundary information in the form of boundary lines, as illustrated in FIG. 1*b*, is then entered by the metes and bounds tool on the viewing window 106. The metes and bounds tool is described in more detail with respect to the description at FIG. 4.

Figure 5:
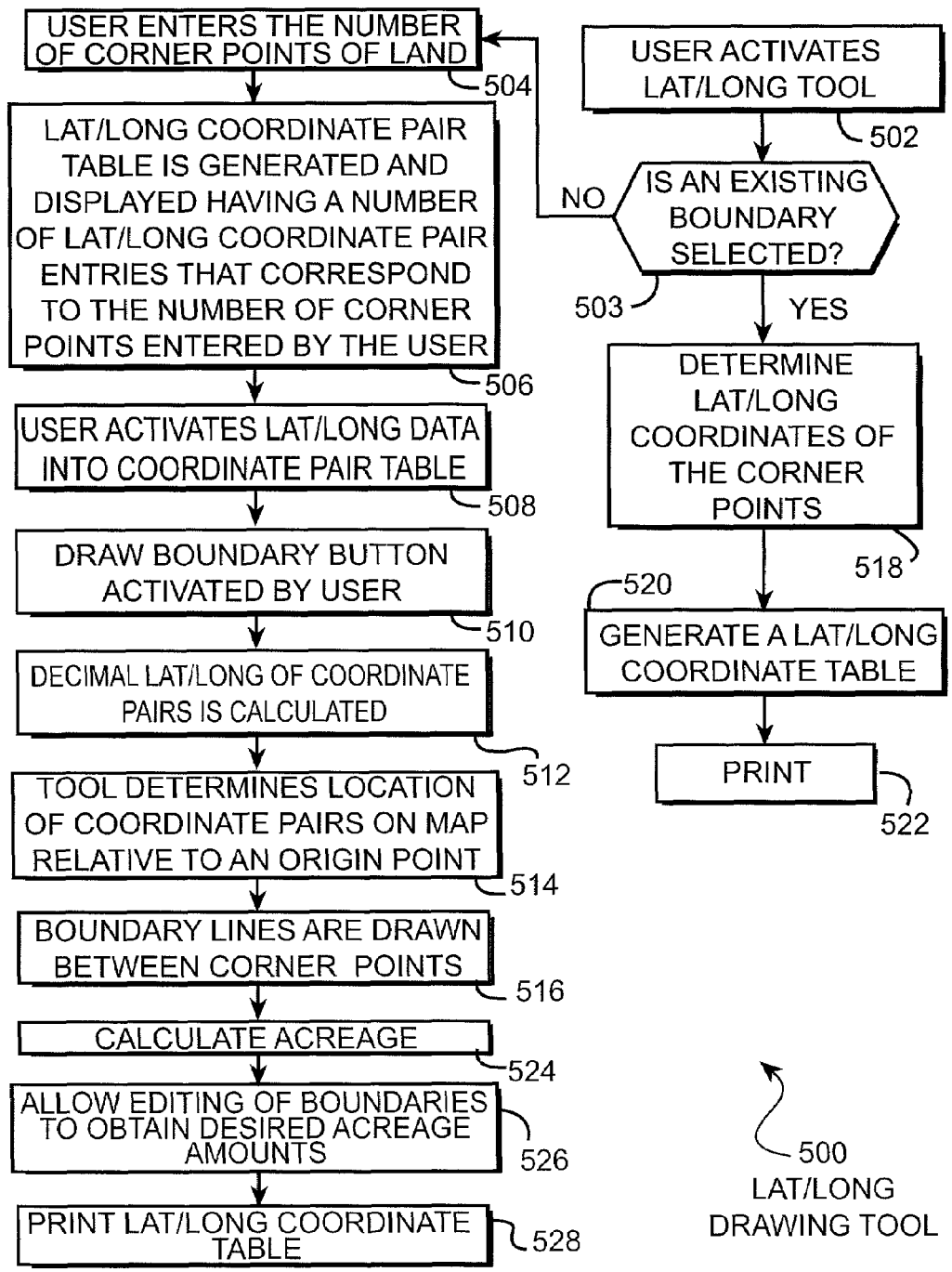
FIG. 5 is a flow diagram illustrating the operation of the latitude/longitude drawing tool.

In addition, latitude and longitude coordinates for the corners of the land of interest can be entered in the lat/long drawing tool 500 described in FIG. 5. The lat/long drawing tool 500 then generates the boundary line information 104, as indicated in FIG. 1*b*. The latitude and longitude coordinates can be obtained in various ways. For example, this data can be recorded as waypoints on a GPS receiver as a result of physical inspection of the land. In addition, this information can be obtained using various map data.

Figure 6:
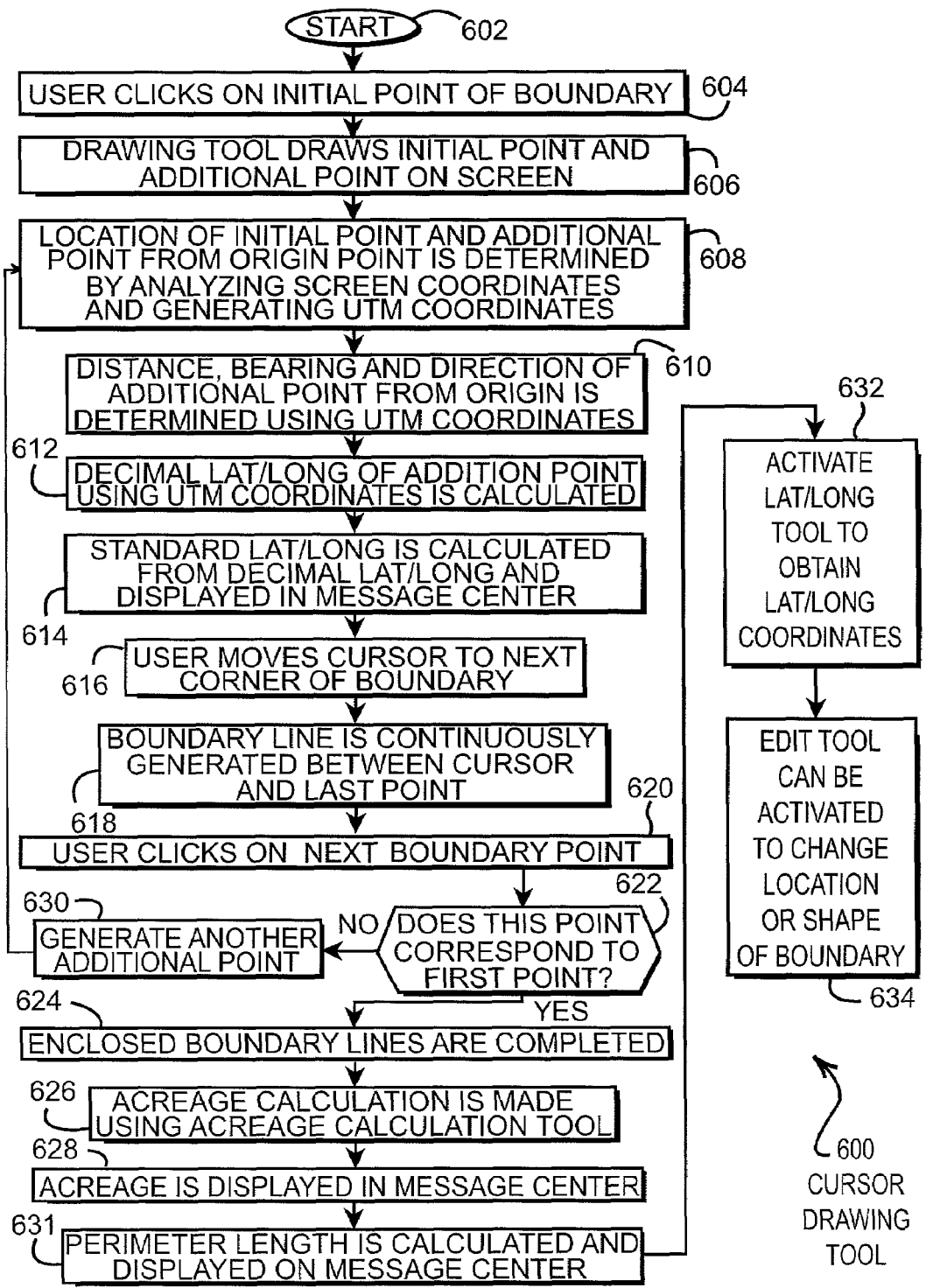
FIG. 6 is a flow diagram illustrating the operation of the cursor drawing tool.

A third method of recording the boundary data 104 includes the use of a cursor drawing tool 600, disclosed in FIG. 6, to visually draw the boundaries 104 around the land of interest. To assist in this process, the user can switch from various scales of maps and also to satellite or aerial imagery to help in identifying boundary points. Each of the boundary points are entered as georeferenced global coordinates that appear on the screen as the user toggles from one set of data to another. This process can be extremely helpful in identifying boundary points. For example, features not present in one set of data, such as an older map, may appear in newer imagery, which allows a user to pinpoint boundary locations. By toggling between various maps and map scales, satellite imagery and aerial imagery, the user can locate boundaries with a high degree of precision.

All three of the above-described methods of recording boundary data illustrate the boundaries on the screen and adjust the underlying map or image data to be placed on the screen in the proper location so that the boundaries appear in the proper location on the underlying map or image data. In addition, the boundary information may be displayed either larger or smaller depending upon the scale of the underlying map or image data. Further, the boundary drawing may be moved on the underlying map or image data to a new location without changing the shape of the boundary drawing. Also, the boundary lines may be edited. For example, a user may wish to change the size of the enclosed boundary to encompass a predetermined size. The user may adjust one or more boundary lines while observing the acreage calculator to obtain the desired size parcel. Also, the process of drawing boundaries and locations normally starts on a USGS topo-quad map that provides sufficiently detailed information to locate the boundaries and locations for the user. As described above, the user can zoom to different scales or toggle to different maps or images to assist in drawing boundaries.

The network accessible tool 164 also includes a map scale 110 that provides the proper map scales and key information regarding the maps. Of course, the map scales and keys change with each different map that is displayed. Various types of map and other data can be displayed on the display screen 102. For example, topo-quad maps, BLM maps, satellite photography, aerial photography, land based photos and regional land use and vegetation satellite maps can be provided. Land based photos, as well as streaming video, can be provided that show the appearance of the land from a particular location.

A "Change Viewer Size" button 112 can also be provided that changes the size of the viewer so that more area can be viewed at one time. This button can be used in combination with the various scale maps and photography information to zoom-in or zoom-out of a particular area, as disclosed in more detail below.

E-mail button 114 allows the user to e-mail a link to a particular portal of the network accessible tool to third parties, such as customers, potential buyers, lenders, appraisers, fellow employees, etc. The affiliate information is associated with the network accessible tool so that the third party also receives the logo information 108. In addition, the e-mail recipient, when logging off the network accessible tool 164 can be automatically linked to the home page of the affiliate, as is the user that e-mails the package to the third party. This increases the exposure of the affiliate's website products and services to third parties.

The "Support" button 116 provides a direct link to the hosting company, which can provide on-line support for the network accessible tool 164. The "Save to Desktop" button allows the image to be saved to the user's desktop. The "Sponsor" button 118 is a direct link to the affiliate's website, which is sponsoring the use of the network accessible tool 164. The "Powered By" button 119 provides a small advertising for the hosting company, which is otherwise transparent to the user. The transparency of the hosting company provides a way that the affiliate can appear as the company that is providing the myriad of user-friendly features of the network accessible tool 164. In other words, the affiliate gets credit for providing the network accessible tool that has great versatility and use.

The "Map Production" button 120 allows the user to print maps and imagery of the area of interest. This is explained in more detail with respect to FIG. 7. In brief, one particular business model may allow a low resolution map to be printed by a user for free, while higher resolution maps and imagery can be printed by the user at a higher resolution. In addition, this button allows the user to e-mail the map and imagery and other photographic imagery to third parties, such as lenders, appraisers, government agencies, co-workers, customers, real estate agents, and others after payment of the printing fee. The metes and bounds button allows entry of the metes and bounds legal description into the metes and bounds drawing tool. The metes and bounds drawing tool enters the boundary data for viewing on the map data and imagery. This is described in more detail with respect to FIG. 4.

The "Lat/Long" button 124 allows a user to enter the latitude and longitude coordinates of the corner points of the land of interest into the network accessible tool 164. This is described in more detail with respect to FIG. 5. "Help" button 126 also provides on-line help in a manner that standard on-line help buttons assist users in operating the network accessible tool 164 through written text. In addition, frequently asked questions and answers are provided through this button. The "New Search" button 128 allows the user to start over from the beginning and search for a new location. The "Delete" button 127 allows the user to erase a selected line, point, or previous boundaries that have been entered on the network accessible tool 164.

Message center 136 gives the user instructions regarding how to use the various tools and features of the network accessible tool 164 and provides information relating to the use of the network accessible tool 164. For example, entry 134 shows the distance that has been plotted by the drawing tool using a cursor between two or more points using the distance measuring tool. Entry 132 shows the total acreage within a boundary that has been entered by the user. Entry 130 indicates the total distance that has been plotted using the boundary tool. The message center 136 can also be used for various other purposes. For example, entry 138 may display the latitude and longitude coordinates for the location of the cursor on the screen as it is being moved across a map or image. In addition, entry 138 may display the bearing, distance and direction, similar to a metes and bounds description, as the cursor is moved.

Scrolling star 140 allows the user to pan across the map and image data by accessing one of the arrows on the star. For example, if the top arrow on the scrolling star is activated, the viewing window will display map or image data that is scrolled in an upward, or northerly, direction on the screen at a predetermined speed. This tool is extremely useful in locating a particular area of land by allowing the user to go to a higher scale map, such as a 1:1,000,000 scale, and scroll or pan across a particular area to the desired location. Then, lower scale maps can be used to zero-in on the land of interest using the scrolling star. The scrolling star has arrows at the north, northeast, east, southeast, south, southwest, west, and northwest directions. This allows scrolling to be performed in various directions as desired by the user. The star can be divided and located on the periphery of the screen on side bars also.

The map gallery 147 provides a way to allow the user to select a particular map or image at a desired scale to view on the viewing window 106. For example, U.S.G.S. maps 146 provide U.S.G.S. maps in a seamless data set at the following scales: 6 k, 12 k, 24 k, 50 k, 100 k, 200 k, 250 k, 500 k and 1,000,000. Similarly, satellite imagery 144 provides shaded relief, natural color satellite images in a seamless data set at the following scales: 24 k, 50 k, 100 k, 200 k, 250 k, 500 k and 1,000,000 k. The BLM maps 142 provide information relating to Bureau of Land Management land ownership for the western United States. The BLM maps provide a seamless data set at the following scales: 24 k, 50 k, 100 k and 200 k. Of course, any scale of map or image data can be provided in the map gallery. Alternatively, a pull down menu can be used in place of the map gallery to conserve screen space. Also, additional maps can be added for general access. Alternatively, special maps can be added that appear on special versions of the GUI for certain affiliates. For example, affiliates that are associated with aviation may wish to display aviation sectional maps, victor airway maps, weather maps, etc.

Tool menu 148 allows a user to access tools to draw, edit and zoom maps. For example, the plus and minus spyglasses allow a change from different scale maps of the same variety. For example, if a U.S.G.S. map is being accessed by the user and the plus spyglass is activated, the next lower scale map will be accessed. The other tools provided in the tool menu include a tool for drawing a boundary, centering on the boundary, selecting points to edit, adding a new point, measuring distance, drawing an out parcel and a metes and bounds flag tool. A crop pivot tool allows the user to draw, measure, locate, define and plan a center pivot irrigation system.

Advertising area 150 also provides an additional area in which the affiliate can provide advertising of its services. The general instruction area 152 provides general instructions on the manner in which the network accessible tool 164 can be operated.

Figure 2:
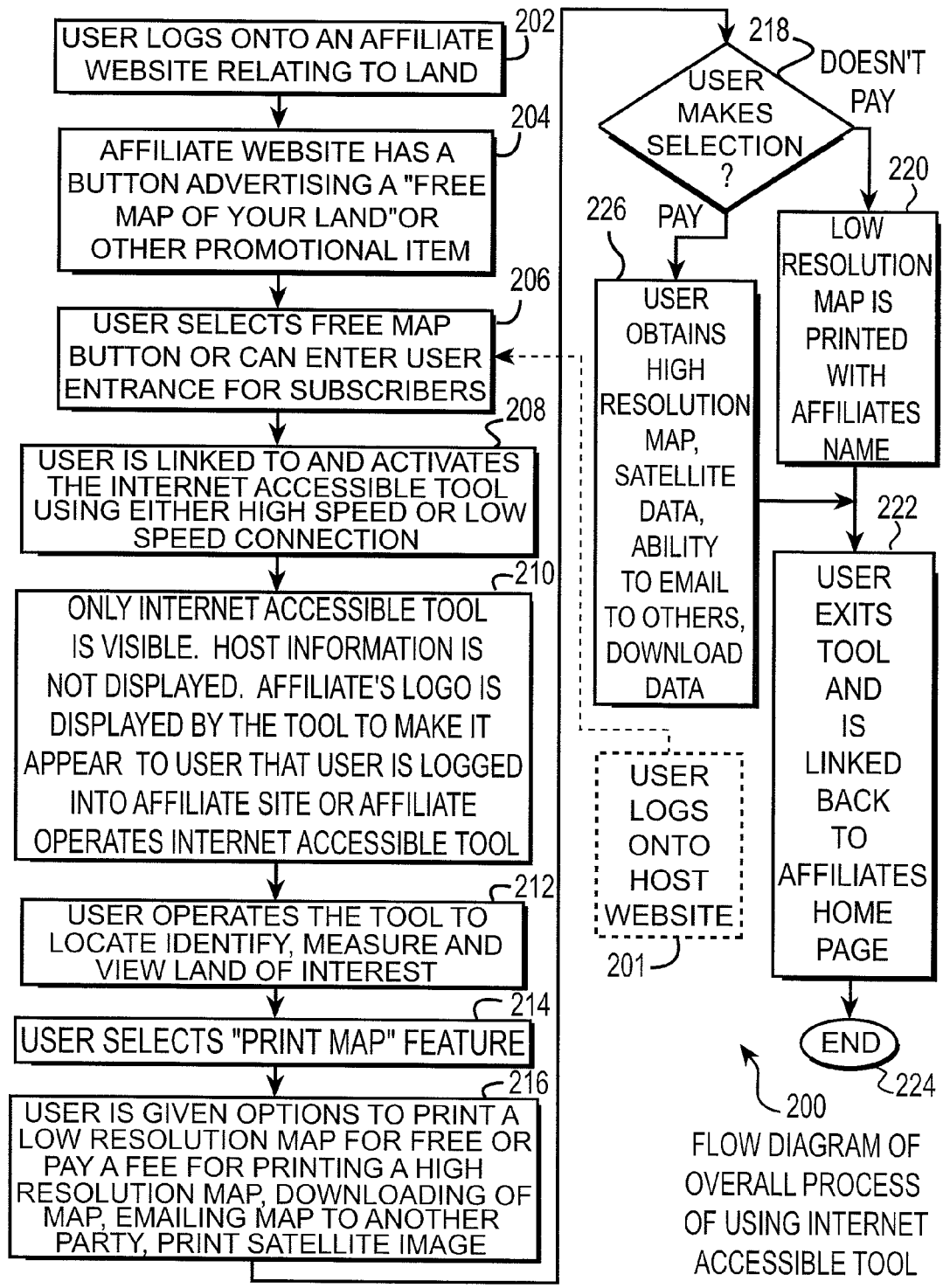
FIG. 2 is a flow diagram illustrating the overall process for using the network accessible tool.

FIG. 2 is a flow diagram 200 of the overall process of using the Network accessible tool 164. At step 202, the user logs on to an affiliate website relating to land. For example, a user may be logged onto the Farm and Ranch website, the Doane Agricultural Services website, etc. Alternatively, the user may access the website through the host provider, as indicated at step 201. At step 204, the affiliate website has a button advertising "Free Map of Your Land" or some other promotion. At step 206, the user selects the free map button or may be a subscriber and enter through the subscriber entrance. At step 208, the user is linked to the network accessible tool 164, which is activated by the host provider of the tool through either a high speed or low speed connection. At step 210, the network accessible tool is displayed to the user so that the host provider is transparent. In other words, no information of the host provider appears on the network accessible tool 164 except the "Powered By" button 119 that is illustrated in FIG. 1. The affiliate's logo 108 is displayed by the tool 164 on the viewing window 106 to make it appear to the user that the user is logged onto an affiliate site, or that the affiliate operates the network accessible tool. At step 212, the user operates the tool to locate, identify, measure and view land of interest. In other words, all of the tools of the network accessible tool can be used by the user, as described above with respect to FIG. 1. For example, the tool can be used by research scientists, or anyone, to study portions of land, including images of the land, buyers and sellers of land, appraisers, assessors, lenders, and others.

The network accessible tool 164 also includes measuring tools for measuring distances, such as the distance of a pipeline or road, the distance from a ranch house to the nearest fire station, etc. These tools can be used for planning and development, pricing for insurance and other uses.

At step 214, illustrated in FIG. 2, the user selects the "print map" feature 120 illustrated in FIG. 1. At step 216, the user is given options to print a low resolution map for free, or pay a fee for printing a high resolution map, downloading the map, e-mailing the map to another party or printing image data. The map printing process is more fully disclosed in FIG. 7.

At step 218, the user makes a selection to either pay for the additional high resolution data and imagery, or to simply print the low resolution map. If the user selects not to pay, the process proceeds to step 220 where a low resolution map is printed with the affiliate's name on the map. At step 222, the user then exits the tool and can be linked back to an affiliate's web page such as the affiliate's home page. The process then ends at step 224. Alternatively, the user can elect to pay for the printing of additional high resolution data. At step 226, the user obtains the high resolution map, satellite data or other imagery and the ability to e-mail others and download the data for a fee. The fee can be collected using standard processes for paying by credit card using secure processes for connection over the network to the host provider. Alternatively, the user can be invoiced for an annual subscription. The process then proceeds to step 222.

Figure 3:
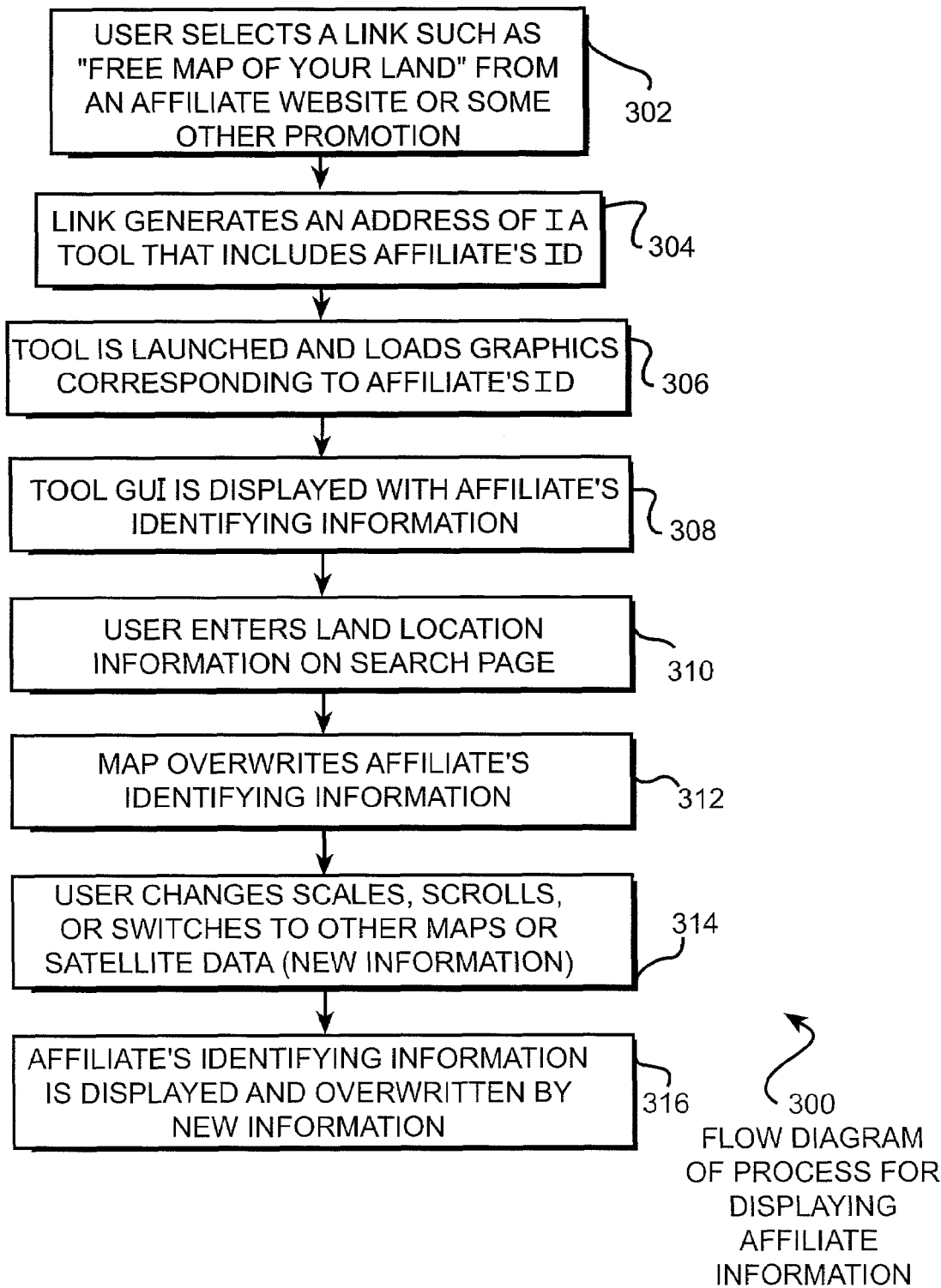
FIG. 3 is a flow diagram illustrating the process for displaying affiliate information.

FIG. 3 illustrates a flow diagram 300 of the process for displaying affiliate information. At step 302, the network accessible tool 164 obtains a request to be activated by a user that has been linked from an affiliate's website. This occurs by the user selecting a link such as "Free Map of Your Land" from the affiliates website. Of course, the user may log onto the host provider's website and link directly into the network tool, in which case no affiliate information will be provided on the viewing window. In this case, the host provider information is provided in the viewing window.

Referring again to FIG. 3, at step 304, the link generates an address of a network accessible tool that includes an affiliate's I.D. For example, the link may be "HTTP://www.land-netusa.com/freemap/boundary.asp?affiliateid=3." As can be seen from the above address, the end portion of the address, i.e., "affiliated=3" indicates the particular affiliate from which the link has been provided. In other words, the link has been provided from affiliate 3. At step 306, the network accessible tool is launched and loads the graphics corresponding to that particular affiliate's I.D., i.e., the graphics corresponding to affiliate #3. At step 308, the network accessible tool graphic user interface 100 is displayed with the affiliate's identifying information. The affiliate's identifying information may be the affiliate's company name and logo that appears on the viewing window 106 (FIG. 1). The user then enters the land location information using the drawing tool, at step 310. At step 312, the map information or satellite information that is displayed on the viewing window 106 overwrites the affiliate's identifying information 108. At step 314, the user may select a different scale map or different type of data, such as satellite data. At step 316, this new information overwrites the affiliate's identifying information that is displayed on the viewing window 106 of the network accessible tool 164.

Figure 4:
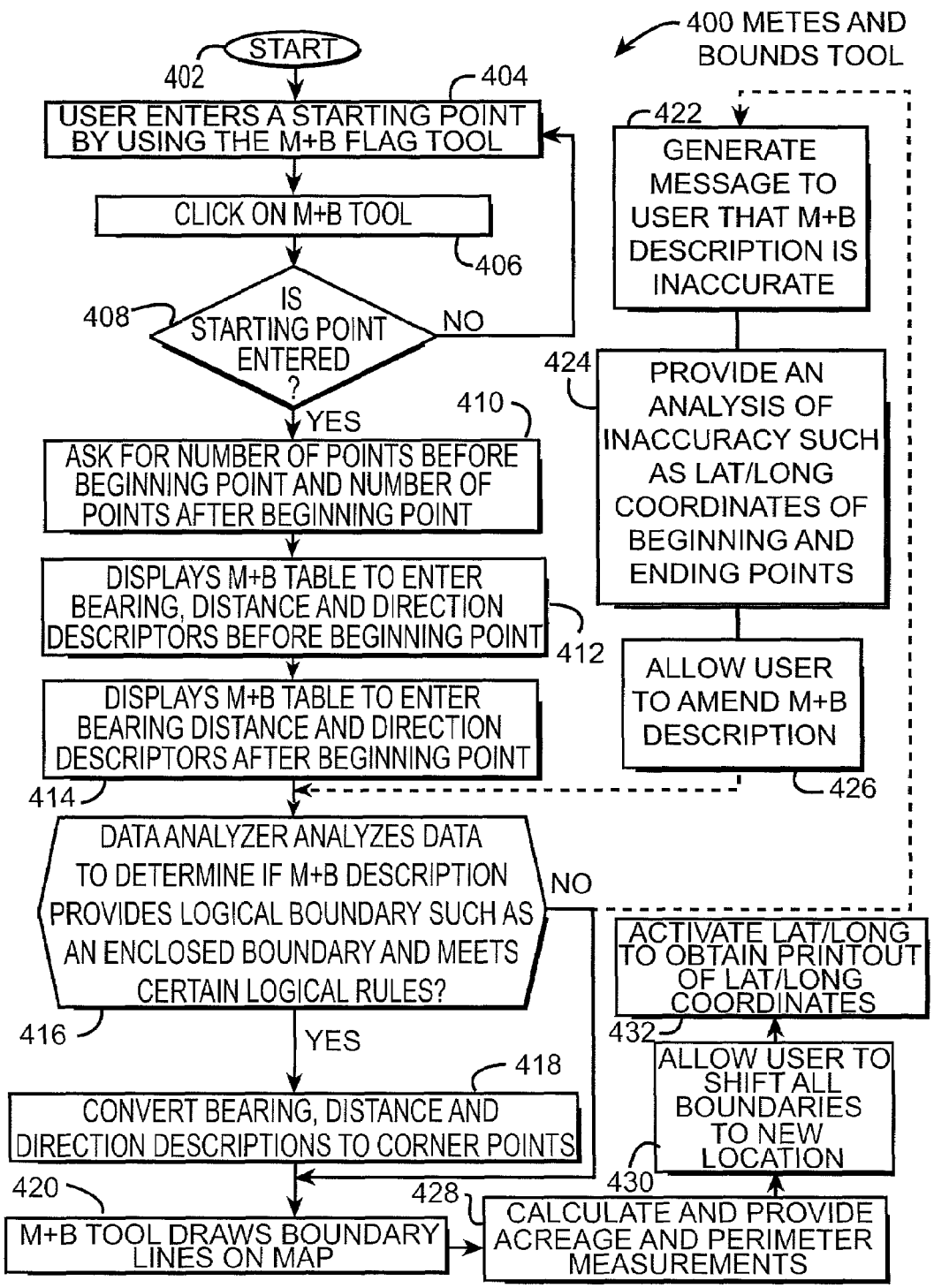
FIG. 4 is a flow diagram illustrating the operation of a metes and bounds tool.

FIG. 4 is a flow diagram that illustrates the operation of the metes and bounds tool 400. At step 402, the process starts. At step 404, the user enters the starting point. This can be done with the metes and bounds flag starting point tool of the network accessible tool, or can be done by using the lat/long search option and entering a latitude and longitude coordinate pair for the starting point, if that is available. The metes and bounds flag tool can then be placed at that lat/long starting point. For example, some metes and bounds descriptions have a starting point or the true point of beginning at some landmark such as "the old oak tree." If the user cannot locate the starting point or the true point of beginning on the network accessible tool, a user can actually visit the land and use a GPS receiver to locate the "old oak tree" and obtain a waypoint from the GPS receiver. The waypoint can then be entered by the user for a starting point or the true point of beginning in the metes and bounds tool using the location search tool, specifically described in FIG. 14 with respect to items 1440 through 1449. A starting point can be typically some point that is easily locatable such as the corner point of a section. The lat/long coordinate pairs of a corner point, if known, can be entered by the user to obtain a very accurate drawing of the boundaries in the manner described above. Then the user simply clicks on the metes and bounds flag tool to locate the starting point at the proper location, as indicated above. The metes and bounds flag tool can also be used for the true point of beginning, which is the initial corner point of the boundary of the land in the metes and bounds description.

Referring again to FIG. 4, at step 406, the user may then click on the metes and bounds tool. At step 408, the metes and bounds tool 400 is capable of determining whether a starting point location has been entered by the user as a metes and bounds flag tool or as a lat/long coordinate pair. If the starting point has not been entered by the user, the process returns to step 404 where the user is instructed to enter the starting point. The metes and bounds flag tool is operated by activating the metes and bounds flag tool button. The user can then move the cursor to the location on the map where the starting point is located. The metes and bounds flag tool is then displayed on the map at that location and latitude/longitude coordinate pairs are determined for the metes and bounds flag tool. The latitude and longitude coordinate pairs for the starting point are determined in the same manner that points are determined using the cursor drawing tool, as described in more detail with respect to FIG. 6 below.

If it is determined at step 408 that the starting point has been entered, the process proceeds to step 410 where the user is prompted to enter the number of points in the metes and bounds description before the true point of beginning and the number of points after the true point of beginning. In other words, many metes and bounds descriptions start at a section corner or physical object location and describe a path using bearing, distance and direction measurements to the first corner of the land, which is the "true point of beginning." This path from the starting point to the true point of beginning may have several different points since the surveyor must go around certain objects such as lakes, buildings, etc. This number of points is considered the number of points prior to the true point of beginning. The number of points after the true point of beginning is the number of boundary corners of the land.

At step 412, of FIG. 4, the metes and bounds tool then displays a metes and bounds table for entry of bearing, distance and direction descriptions for the number of points before the true point of beginning. At step 414, the metes and bounds tool then displays a metes and bounds table to enter bearing, distance and direction descriptions for the number of points after the true point of beginning, i.e., the number of boundary corner points of the land. At step 412, a data analyzer analyzes the metes and bounds description to determine if the metes and bounds description provides a logical boundary description. The boundary description must meet certain logical rules. For example, the true point of beginning should match the last point of the metes and bounds description. Further, boundary lines should not cross over one another. The data analyzer uses various logical rules such as this to determine if a logical boundary is provided by the metes and bounds description. If the metes and bounds description does provide a logical boundary, the process proceeds to step 418. At step 418, the metes and bounds tool converts bearing, distance and direction descriptions to corner points. After the corner points are located at step 418, the metes and bounds tool draws the boundary lines between each of the corner points of the land, at step 420. If it is determined at step 416 that a logical boundary is not provided, the metes and bounds tool can simply proceed to step 420 and draw the boundaries that are shown. Alternatively, the metes and bounds tool may proceed to step 422 to generate a message to the user that the metes and bounds description is inaccurate and display the boundary. At step 424, the metes and bounds tool can provide an analysis of the inaccuracy such as the lat/long coordinates of both the beginning and ending points of the land description. This provides the user with a written description of the discrepancy as well as a visual indication of the discrepancy. At step 426, the user is then allowed to amend the metes and bounds description. The process then proceeds to step 416 for data analysis.

Metes and bounds descriptions can, alternatively, be manually entered using the cursor drawing tool of FIG. 6. For example, the user may locate the true point of beginning from the metes and bounds descriptions on the map or image data. The user can then locate the cursor on the map and read the bearing, distance and direction information from the message center to follow the metes and bounds description. Each corner point can then be located manually using this process until the metes and bounds description is fully entered by hand by the user. The operation of the cursor drawing tool is described more fully below with respect to FIG. 6. Once the metes and bounds boundary is drawn, a user can obtain a lat/long coordinate printout by clicking the lat/long button. Hence, the metes and bounds tool provides the metes and bounds boundary on georeferenced map data over the network and allows the user to toggle to other image data, such as satellite image data and aerial photography once the metes and bounds has been drawn. Again, the boundary data will appear on the underlying image data and various map data at different scales and adjust the size of the boundary data based upon the scale of the map or image data. In all of these cases, the boundary data is georeferenced to the underlying image data and map data.

Referring again to FIG. 4, after the metes and bounds tool draws the boundary lines on the map at step 420, the metes and bounds tool calculates and provides acreage and perimeter measurements at step 428. At step 430, the user can then shift all of the boundaries of the metes and bounds description to a new location. For example, if a starting point was incorrectly entered, and the user realizes that the boundaries do not align with certain image data, the user can shift the entire boundary set and maintain the same shape to a new location so that the boundaries correspond to the proper location of the land. At step 432, the lat/long tool button can then be activated to obtain a display of the lat/long coordinates, which can be printed by the user to obtain lat/long coordinates of each of the corner points of the land.

FIG. 5 illustrates the steps 500 that are performed by the lat/long drawing tool. At step 502, the process starts by the user activating the lat/long tool. At step 503, the lat/long drawing tool determines if an existing boundary has been selected by the user. This may occur by the user highlighting an existing boundary that appears on the screen. If an existing boundary has not been selected, the process proceeds to step 504. More than one boundary can be entered into the network accessible tool using the lat/long drawing tool 500, the metes and bounds tool, or any other drawing tool. At step 504, the user enters the number of corner points of the land of interest. For example, a triangular piece of land would have three corner points. A square, rectangular or trapezoidal piece of land would have four points, and so on. At step 506, a lat/long coordinate pair table is generated and displayed having a number of lat/long coordinate pair entries that correspond to the number of corner points that were entered by the user. An example of a lat/long coordinate pair table is disclosed in FIG. 10. At step 508, the user then enters the lat/long data of the corner points into the table. At step 510, the user activates the "Draw Boundary" button. At step 512, the decimal lat/long coordinate pairs are calculated by the lat/long drawing tool 500. At step 514, the location of the coordinate pairs of the corner points is then located on the map data relative to an origin point. This may be accomplished by conversion of the lat/long coordinate pairs to UTM coordinates using a UTM origin point. At step 516, boundary lines are then drawn between the corner points. At step 524, the lat/long tool can then access the acreage calculator tool to calculate the acreage and provide a readout on the message center of the approximate acreage of the boundary. At step 526, the user can then access the editing tools to edit the boundaries to obtain a desired acreage amount, which is displayed in the message center. At step 528, the lat/long coordinate table for the edited lat/long coordinate pairs can then be printed. If it is determined at step 503 that an existing boundary has been selected, the lat/long drawing tool 500 will analyze the boundary that has been selected to generate a table of lat/long coordinates for the entered boundary data. Hence, the process proceeds to step 518 to determine the lat/long coordinates of the corner points of the boundary that has been selected. At step 520, a lat/long coordinate table is then generated similar to the lat/long coordinate table illustrated in FIG. 10 that provides the lat/long coordinates of each of the corner points of the boundary. This coordinate table can then be printed at step 522.

FIG. 6 is an illustration of the steps that are performed by the cursor drawing tool 600. As shown in FIG. 6, the process starts at step 602. At step 604, the user clicks on an initial point of the boundary that is to be drawn by the cursor drawing tool 600. At step 606, the drawing tool draws an initial point and an additional point on the screen. At step 608, the system determines the location of the initial point and the additional point on the map data relative to an origin point. This is done by analyzing screen coordinates (such as counting pixels) and generating Universal Transverse Merkator (UTM) coordinates. At step 610, the distance, bearing and direction of the additional point from the origin point is determined using the UTM coordinates. This information can be used to generate metes and bounds boundaries. At step 612, the decimal lat/long of the point is calculated using the UTM coordinates. At step 614, the regular lat/long coordinate pairs are calculated from the decimal lat/long coordinate pairs and displayed in the message center 136. These coordinate pairs for each corner point may also be recorded in a lat/long coordinate pair table, such as disclosed with respect to the description of FIG. 5, which can later be displayed to the user. At step 616, the user then moves the cursor to the next corner of the boundary that the user wishes to draw using the cursor drawing tool 600. At step 618, a boundary line is continuously generated between the cursor and the last corner point. At step 620, the user clicks on the next boundary point. At step 622, it is determined whether this boundary point coincides with the first point. If it does not, this means that a completed boundary has not been generated by the user and another additional point is drawn at step 630. The process then returns to step 608. If it does correspond to the first point, the process proceeds to step 624 where the enclosed boundary lines are generated. At step 626, the acreage of the enclosed boundary is calculated using the acreage calculation tool described below with respect to FIG. 11. At 628, the acreage is displayed in the message center. Also, the metes and bounds tool may generate bearing, distance and direction information that is loaded into the tables illustrated in FIG. 11 from the boundary lines of the cursor drawing tool. In this manner, metes and bounds descriptions can be generated from boundaries drawn with the cursor drawing tool. In addition, the lat/long tool may generate lat/long coordinate pairs such as illustrated in FIG. 10 from the boundary lines of the cursor drawing tool. At step 631, the perimeter length can then be calculated by the network accessible tool and displayed on the message center. At step 632, the lat/long tool can be activated to obtain the lat/long coordinates which may be displayed on the screen and printed. At step 634, the edit tool can be activated to change the shape or location of the boundary data.

Figure 7:
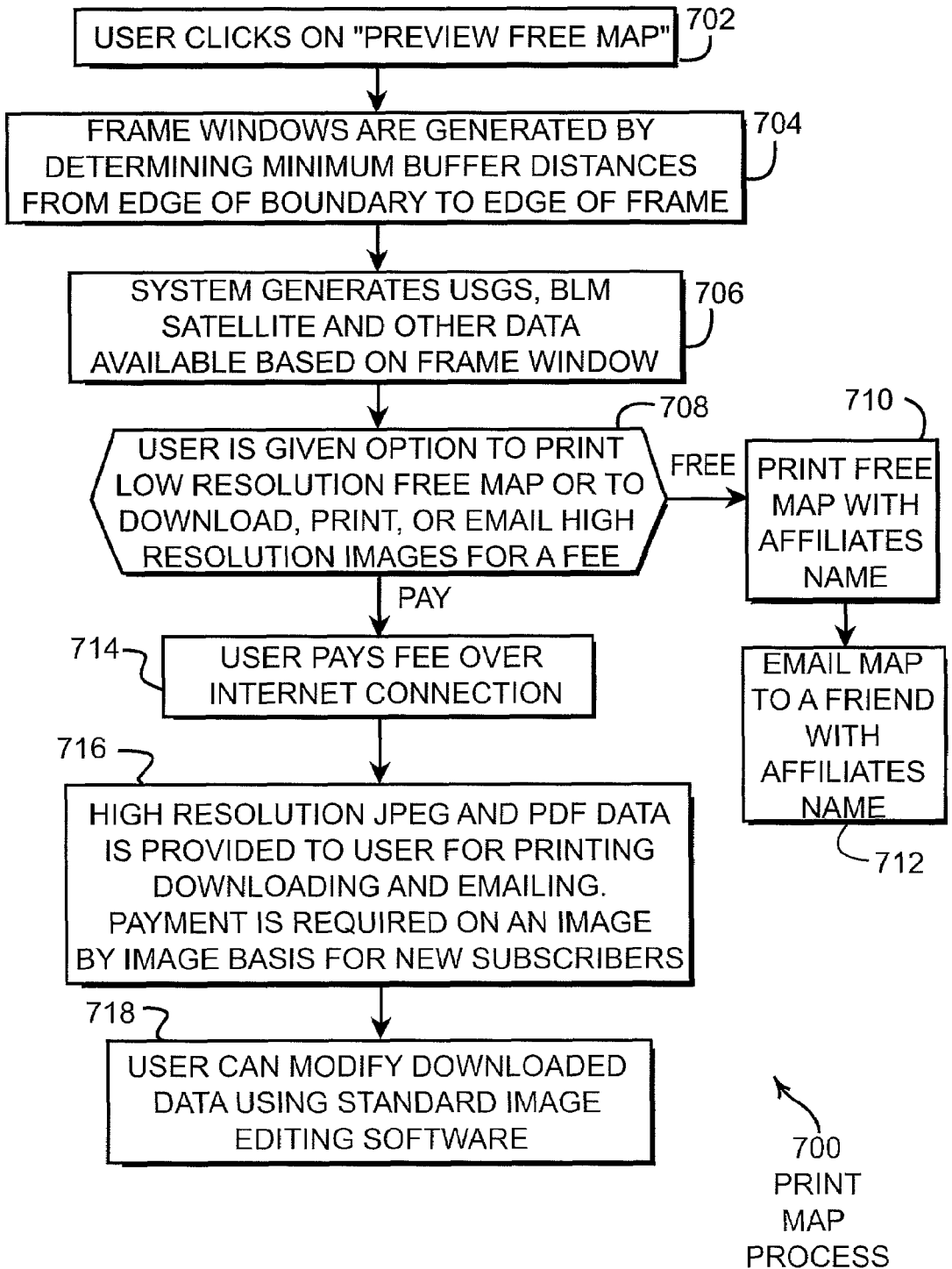
FIG. 7 is a flow diagram illustrating the process for printing a map.

FIG. 7 illustrates the processes that are performed by the print map tool 700. At step 702, the user clicks on the button that indicates "Preview Free Map". At step 704, frame windows are generated by determining a minimum buffer distance of the boundary lines to the edge of the frame window of the map. At step 706, the system generates USGS, BLM, satellite and other data that is available to the network access tool 164. At step 708, the user is then given the option to print a low resolution free map or to download, print or e-mail high resolution data for a fee. If the user selects to print a free map, a low resolution map is printed with an affiliate's name printed on the map at step 710. At step 712, a JPEG image of the free map can then be e-mailed to a friend that additionally includes the affiliate's identification information on it as explained more fully with respect to the description of FIG. 8. If the user elects to pay a fee for any of the high resolution data, at step 714, the user selects and makes the payment over the network. The payment can be made by credit card, on-line, using standard credit card payment secure connections. At step 716, high resolution JPEG and PDF image data is provided for printing, downloading and e-mailing. The user pays for each one of these functions and for each individual image. Various other payment arrangements can be established such as an unlimited use of the network accessible tool if the user pays a subscription fee. At step 718, the user can then modify the downloaded map and image data using standard image editing software such as Photo Shop. Alternatively, the user can add custom text using the network accessible tool.

Figure 8:
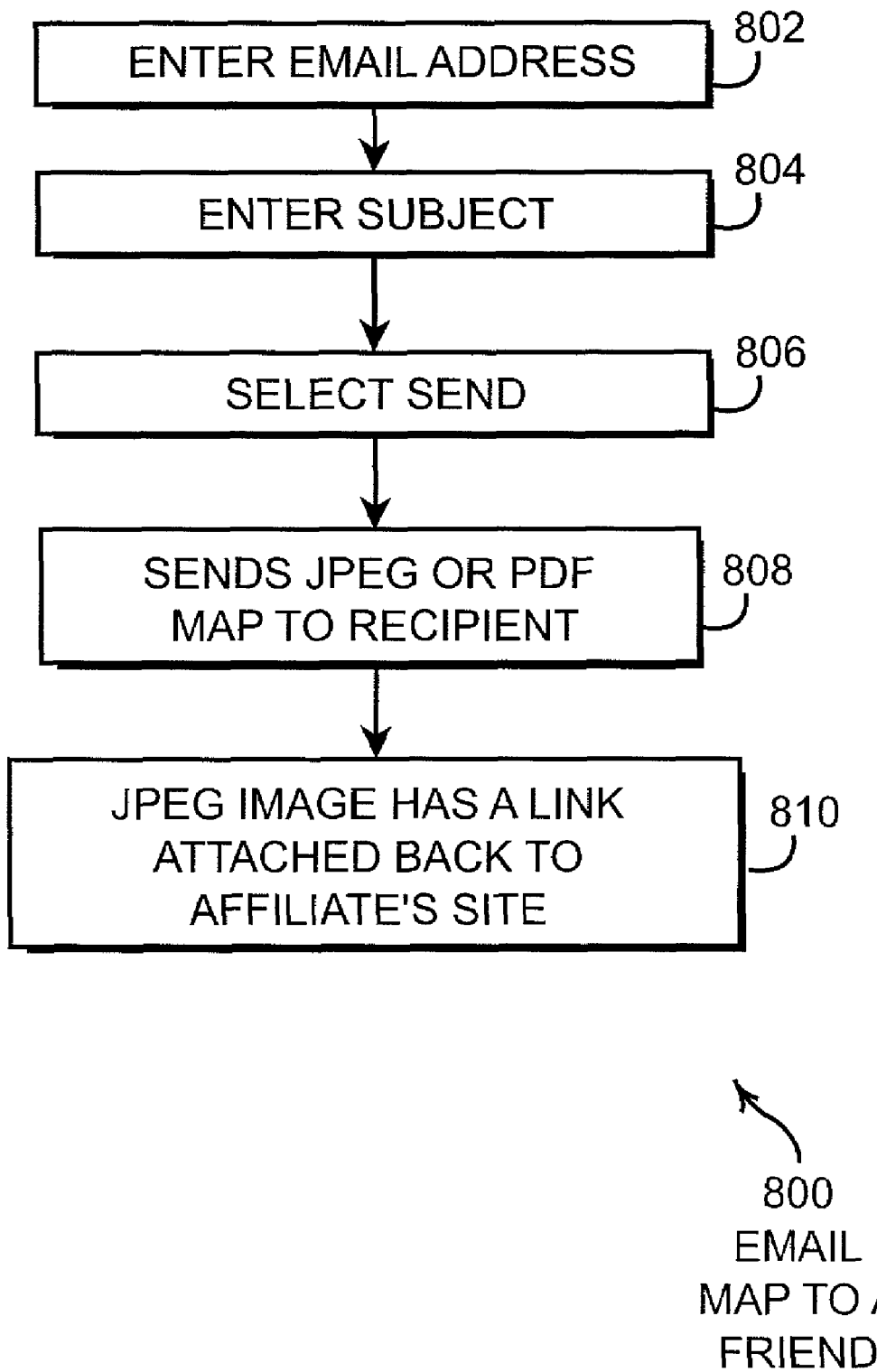
FIG. 8 is a flow diagram illustrating the process for e-mailing a map to another party.

FIG. 8 discloses the steps 800 for e-mailing a map or other image data to a friend. At step 802, the user enters the e-mail address of the recipient. At step 804, the user enters the subject matter of the e-mail. At step 806, the user selects the send option. At step 808, the PDF, JPEG or other image of the map or satellite data or other photographic data is transmitted over the network to the recipient. At step 810, a link is provided with the JPEG image that is sent to the recipient that allows the recipient to link back to the affiliate's site.

Figure 9:
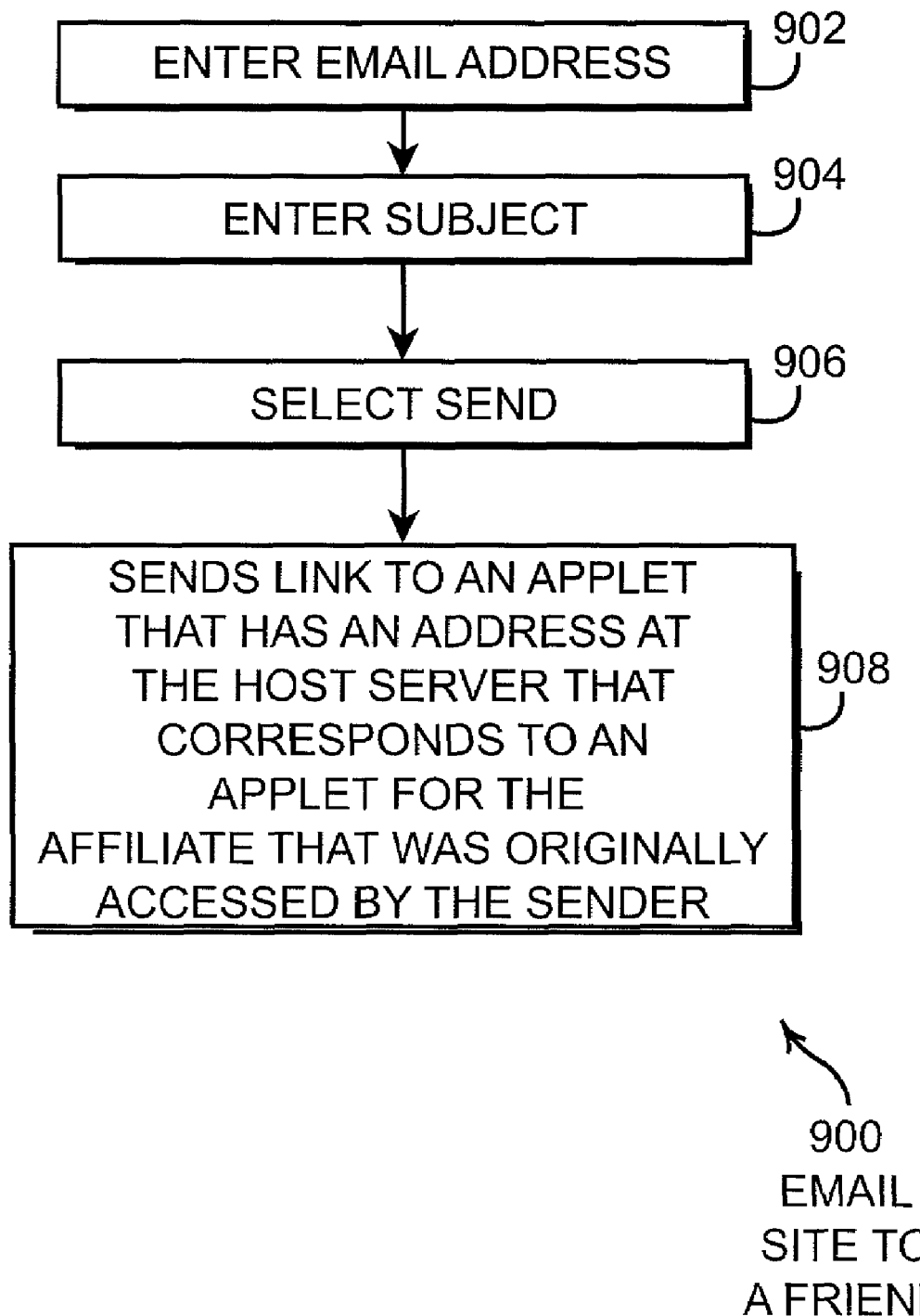
FIG. 9 is a flow diagram illustrating the method of e-mailing the network accessible tool to another party.

FIG. 9 illustrates the steps 900 for e-mailing the Internet site containing the network accessible tool to a friend. At step 902, the user enters the e-mail address of the recipient. At step 904, the subject of the e-mail is entered by the user. At step 906, the user selects the send option to send the Internet site link to the recipient. At step 908, the network accessible tool 164 sends the link of an applet that has an address at the host server that corresponds to an applet for the particular affiliate that was originally accessed by the sender. In other words, the recipient, when linking to the host server, accesses an applet that shows the affiliate's identification and advertising information and allows the recipient to operate the network accessible tool with that affiliate information showing. In this fashion, when the user sends the link to a friend, the affiliate gains additional advertising and credit for the functions that are provided by the user-friendly network accessible tool 164.

FIG. 10 is an illustration of a coordinate pair table that is generated by the network accessible tool 164. As shown in FIG. 10, a dialog box 1002 is generated that has a series of table entries 1004, 1006, 1008 and 1010. The user can then enter the latitude and longitude coordinate pairs in the table to identify the corner points of the land of interest. In the example shown in FIG. 10, four coordinate points are illustrated. After the coordinate pair information is entered, button 1012 can be activated to drawn the boundary on the viewing window 1006 between the corner points. Button 1014 allows the user to cancel the process. Button 1016 allows the user to print the data that has been entered in the table. Button 1018 provides a help menu for the user. As indicated above, the lat/long data points can be obtained using a GPS receiver and recorded through actual physical inspection of the land. If the user uses the cursor drawing tool of FIG. 6 to draw a boundary, the user can activate the Lat/Long button 122 on FIG. 1b and generate a copy of the coordinate pairs on the coordinate pair table 1002 of FIG. 10. The user can then print the table 1002 and use this table in the field with a GPS device to find the corner points as they were drawn on the screen.

FIG. 11 illustrates a dialog box 1100 for entering metes and bounds descriptions. As shown in FIG. 11, four bearing, distance and direction entries 1102, 1104, 1106 and 1108 are shown. The user can enter the bearing, distance and direction of each leg of the metes and bounds description in the table. As shown in FIG. 11, four legs are shown after the true point of beginning. A separate dialog box, similar to dialogue box 1100, may be used to enter legs of the metes and bounds description for bearing, distance and direction descriptions from the starting point to the true point of beginning. Similarly, once the boundaries are drawn by the metes and bounds tool the lat/long tool can be activated using button 122 on FIG. 1b to generate and print a copy of the coordinate pairs for the corner points of the metes and bounds drawing. The user can then enter these points in a GPS device to find the corner points of the metes and bounds description in the field. The Continue button 1110 can be used to continue the process. The Cancel button 1112 can be used to cancel the process. The Print button 1114 can be used to print the page. The Help button can be used to seek help within the process.

Figure 12:
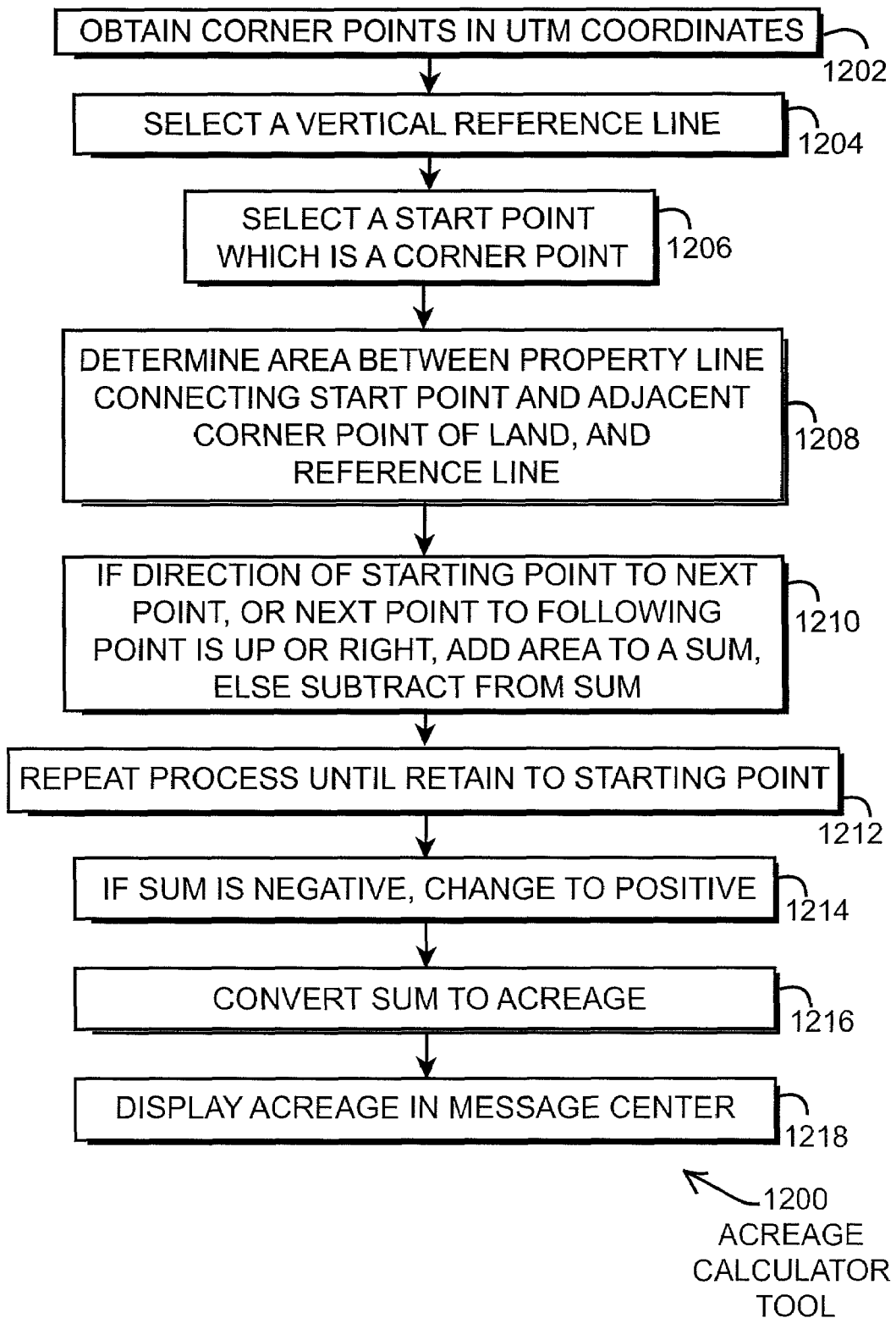
FIG. 12 is a flow diagram illustrating the acreage calculation tool.

FIG. 12 illustrates the operation of the acreage calculation tool 1200. At step 1202, the corner points of the land for which the acreage is going to be calculated are obtained in UTM coordinates. At step 1204, a vertical reference line is established. This vertical reference line can be adjacent the land at any desired distance. In actuality, the vertical reference line can be a horizontal reference line or any straight line at any desired angle and can even pass through the boundary line. For purposes of simplicity of this description, however, is described with reference to a vertical reference line. At step 1206, a starting point, which is a corner point of the land, is selected. At step 1208, the area between the boundary line connecting the start point and an adjacent corner point of the land, and the reference line, is determined. In other words, horizontal lines from the two corner points on the boundary are projected over to the vertical line and the area is then determined. The geometric shape is normally a square, rectangle or trapezoid so that the area can easily be determined. At step 1210, it is determined if the direction from the starting point to the next point, or the next point to a following point, is up or to the right. If so, this area is added to an accumulated sum as each of the areas is calculated. Otherwise, the area is subtracted from the sum. At step 1212, this process is repeated until the process returns to the starting point. At step 1214, if the sum is a negative number, it is changed to a positive number. At step 1216, the sum is then converted to an acreage value since the UTM coordinates are established in meters. At step 1218, the message center displays the acreage amount.

Figure 13:
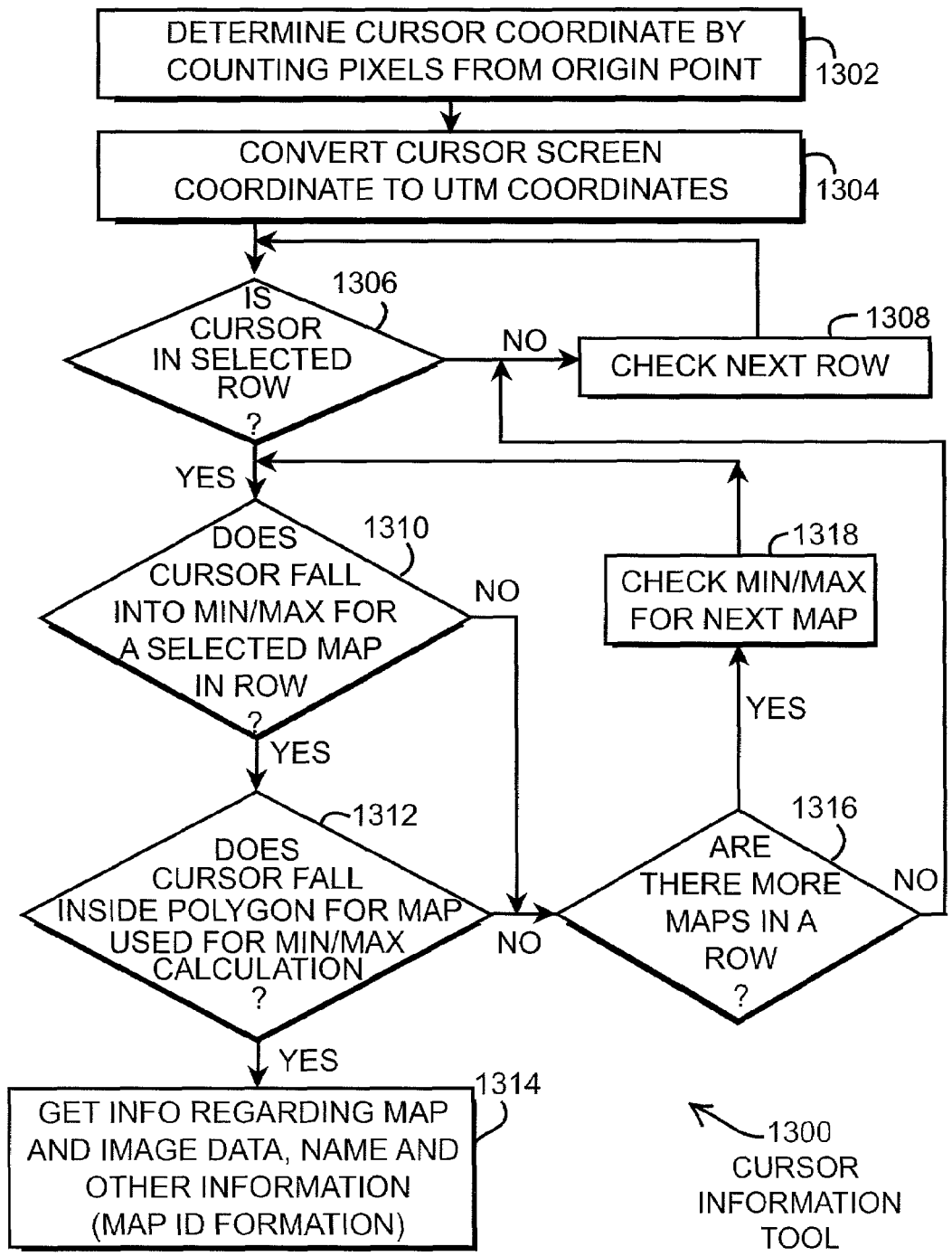
FIG. 13 is a flow diagram illustrating the operation of the cursor information tool.

FIG. 13 is a flow diagram illustrating the steps 1300 of the cursor information tool. At step 1302, the coordinates of the cursor are determined by counting pixels from the origin point. The purpose of the cursor information tool is to allow the user to move the cursor across the screen and obtain information relating to the underlying map or image data (map identification information). At step 1304, the cursor screen coordinate is then converted to a UTM coordinate. At step 1306, a decision is made as to whether the cursor is located in a selected row. In other words, a series of rows are formed that contain overlapping maps. At step 1306, each of the rows is sequentially selected and it is determined whether the cursor sits in that particular row. If the cursor is not in that row, the process proceeds to step 1308 to check the next row. The process then returns to 1306 to determine if the cursor is in that next row. This loop continues until it is determined which row the cursor is located. At step 1310, it is then determined whether the cursor falls within a minimum or maximum range that is set for a selected map (a proximity location of a specific map) in the correct row. In other words, a proximity location is selected for each map in the row by selecting min/max limits which are checked to determine if the cursor falls within those min/max ranges. If it does not, the process proceeds to step 1316 to determine if there are more maps in the row. If there are, the min/max limits for the next map are checked and the process returns to step 1310. If it is determined at step 1316 that there are no more maps in the row, the process returns to step 1308 to check the next row. If it is determined at step 1310 that the cursor does fall within the min/max for a selected map, the process proceeds to step 1312 to determine if the cursor falls inside the actual map polygon that was used to calculate the min/max limits. Because a large number of maps are stitched together and distortions are created by the curvature of the earth, there may be an overlap in the stitching process. The stitching process in the longitudinal direction may not create a vertical line, which requires further analysis to determine which map polygon contains the cursor. If the cursor does not fall inside the map polygon, it must fall within another map polygon and the process proceeds to step 1316 to determine if there are more maps in the row. If it is determined that the cursor does fall within the actual polygon of the map, the process proceeds to step 1314 and retrieves the information regarding the map data, name and other information relating to the map. If it is determined at step 1316 that there are more maps in the row, the process proceeds to step 1318 to check for the minimum and maximum parameters of the next map. The process then returns to step 1310. If map or image data is downloaded or printed, identification information relating to the map and image data (map identification information) can be included.

Figure 14:
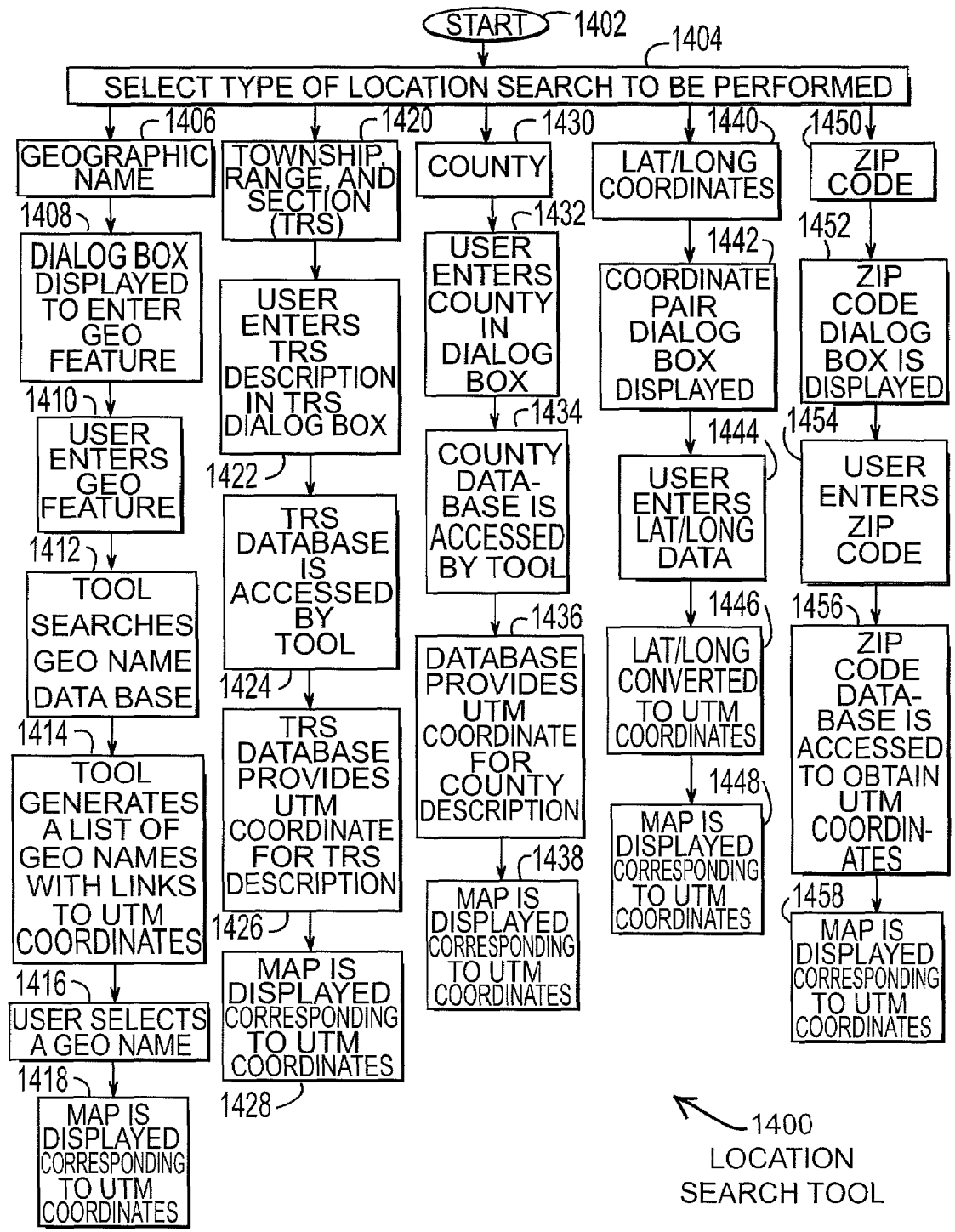
FIG. 14 is a flow diagram illustrating the operation of the location search tool.

FIG. 14 is a flow diagram illustrating the steps 1400 of the location search tool. At step 1402, the process starts. At step 1404, the user selects the type of location search to be performed. At step 1406, the user selects a geographic name search. At step 1408, a dialog box is displayed so that the user can enter the geographic feature to locate the land of interest. At step 1410, the user enters the geographic feature in the dialog box. At step 1412, the network access tool searches a geographic name database, which is a database of approximately 2 million geographic features, landmarks, town names, etc. At step 1414, the network access tool generates a list of geographic names that have been extracted from the geographic name database that relate to the geographic feature or name entered by the user in the dialog box. These geographic names are linked with the UTM coordinates for that geographic feature. The user then selects the geographic name that mostly closely fits the location being searched at step 1416. At step 1418, a map is displayed with the UTM coordinate corresponding to the selected geographic name, which is located at the center of the map. An "x" or other indicator can be provided on the map or image data to locate the geographic feature. For example, the "x" or other indicator may be placed in the geographic center of a county, when a county is used as the geographic feature.

If the user selects the township, range and section search, the process proceeds to step 1420. At step 1422, the user enters the township, range and section description in a township, range and section (TRS) dialog box that is generated by the network accessible tool. At step 1424, a TRS database is accessed by the network accessible tool. The TRS database is a listing of township, range and section descriptions that are linked to UTM coordinates that are located at the center of the TRS descriptions. At step 1426, the TRS database provides the UTM coordinate for the TRS description that has been entered by the user in the TRS dialog box. At step 1428, a map is displayed corresponding to the UTM coordinate that has been provided by the TRS database. Again, an indicator such as an "x" may be placed close to the center of the section.

The user may also select a county description such as illustrated at step 1430. At step 1432, the user enters the county and state in a dialog box that is provided by the network accessible tool. At step 1434, a county database is accessed by the network accessible tool. The county database is a listing of counties for each state and a corresponding UTM coordinate that corresponds to the center of that particular county. At step 1436, the county database provides that UTM coordinate for the county description that has been entered by the user. At step 1438, a map is displayed corresponding to that UTM coordinate. An indicator may then be placed in the geographic center of the county, as described above.

The user may also select latitude and longitude coordinates to perform a location search at step 1440. At step 1442, a coordinate pair dialog box is displayed that is generated by the network accessible tool. A coordinate pair dialog box is similar to the dialog box illustrated in FIG. 10. At step 1444, the user enters the lat/long data in the dialog box. At step 1446, the lat/long data is converted to UTM coordinates. At step 1448, a map is then displayed corresponding to the UTM coordinates that were determined at step 1446. An indicator may then be placed on the lat/long coordinate pair location.

The user can also select a zip code search at step 1450 of FIG. 14. At step 1452, a zip code dialog box is displayed by the network accessible tool. At step 1454, the user then enters the desired zip code in the dialog box. At step 1456, a zip code database is accessed to obtain UTM coordinates. The zip code database is a database that contains a set of UTM coordinates that are at the center location of each of the zip codes across the United States. At step 1458, a map is then displayed corresponding to the UTM coordinates. An indicator may then be placed at the geographic center of the zip code. The user may also just select a state, in which case the entire state would be displayed and an indicator would be placed in the geographic center of the state.

Figure 15:
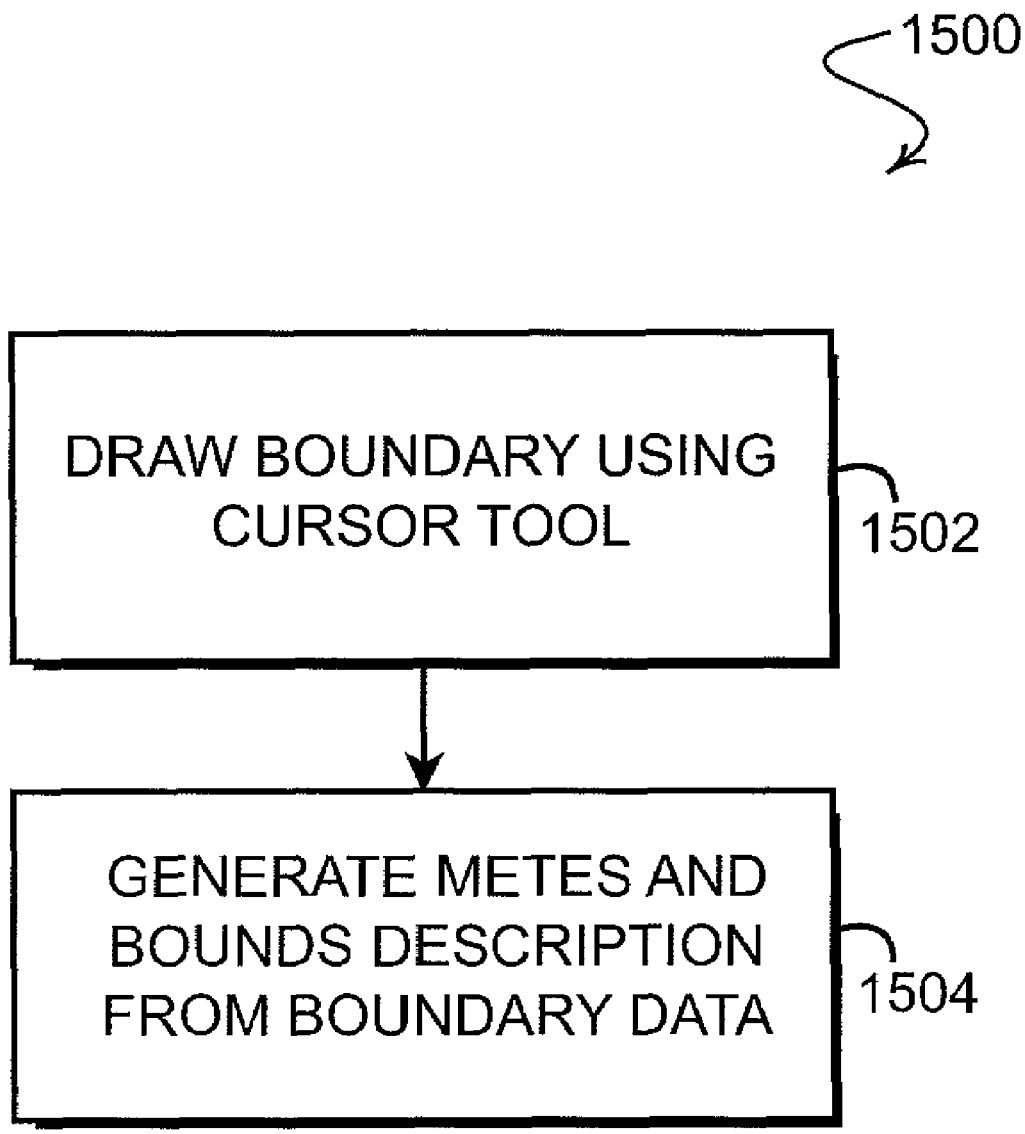
FIG. 15 is a flow diagram illustrating one manner in which the cursor tool may be used in conjunction with the metes and bounds tool.

FIGS. 15 through 19 described the manner in which several of the tools included in the network accessible tool can be used in conjunction with one another to generate and obtain data. FIG. 15 discloses a flow diagram 1500 that describes the manner in which the cursor tool may be used in conjunction with the metes and bounds tool. At step 1502, a user can draw a boundary on a map or other image data using the cursor tool as described above. Once the boundary is recorded, in the manner described above, the UTM coordinates are recorded. At step 1504, the metes and bounds tool can then be used to generate a metes and bounds description, such as disclosed in FIG. 11, from the recorded boundary data as described above. In this fashion, hand-drawn boundaries can be transformed into metes and bounds descriptions.

Figure 16:
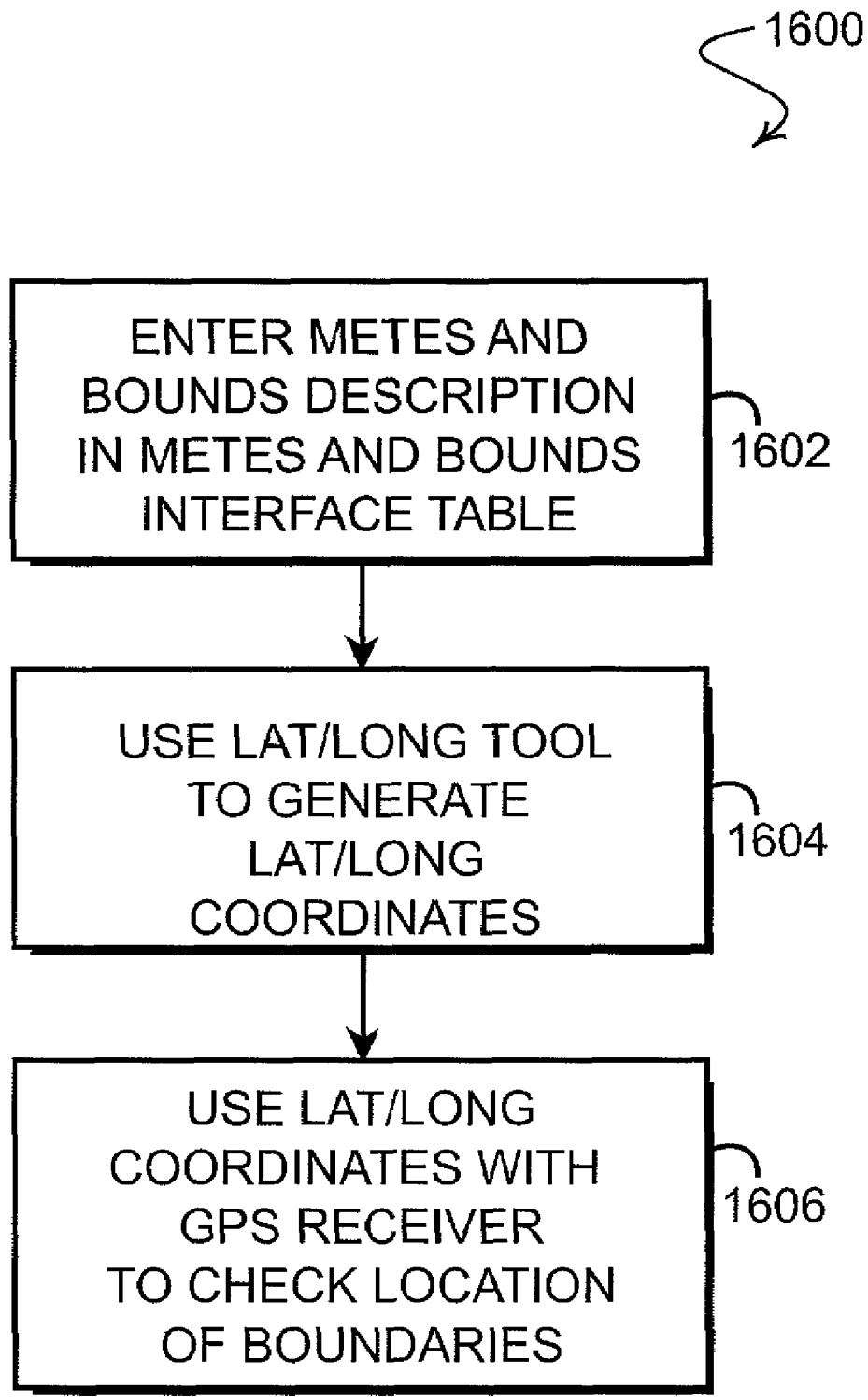
FIG. 16 is a flow diagram illustrating one manner in which the metes and bounds tool can be used in conjunction with the lat/long tool.

FIG. 16 describes the manner in which the metes and bounds tool can be used in conjunction with the lat/long tool and a GPS receiver, in accordance with the flow diagram 1600. At step 1602, the user can enter the metes and bounds description in the metes and bounds interface table, such as disclosed in FIG. 11, that comprises a portion of the metes and bounds tool. The recorded data from the metes and bounds table 10 is then used to draw the boundaries which are recorded as UTM coordinates by the network interface tool. At step 1604, the lat/long tool can then be used to generate lat/long coordinates, such as disclosed in FIG. 10, from the recorded UTM coordinates. The lat/long tool can then generate a lat/long table such as disclosed in FIG. 10 for viewing of the lat/long coordinates. At step 1606, the user can then record these lat/long coordinates as way points in a GPS receiver to actually physically check the location of the boundaries on site. Recordation of the lat/long coordinates can be manually entered into the GPS receiver, or an interface can be provided for automatically recording this information generated by the lat/long table illustrated in FIG. 10.

Figure 17:
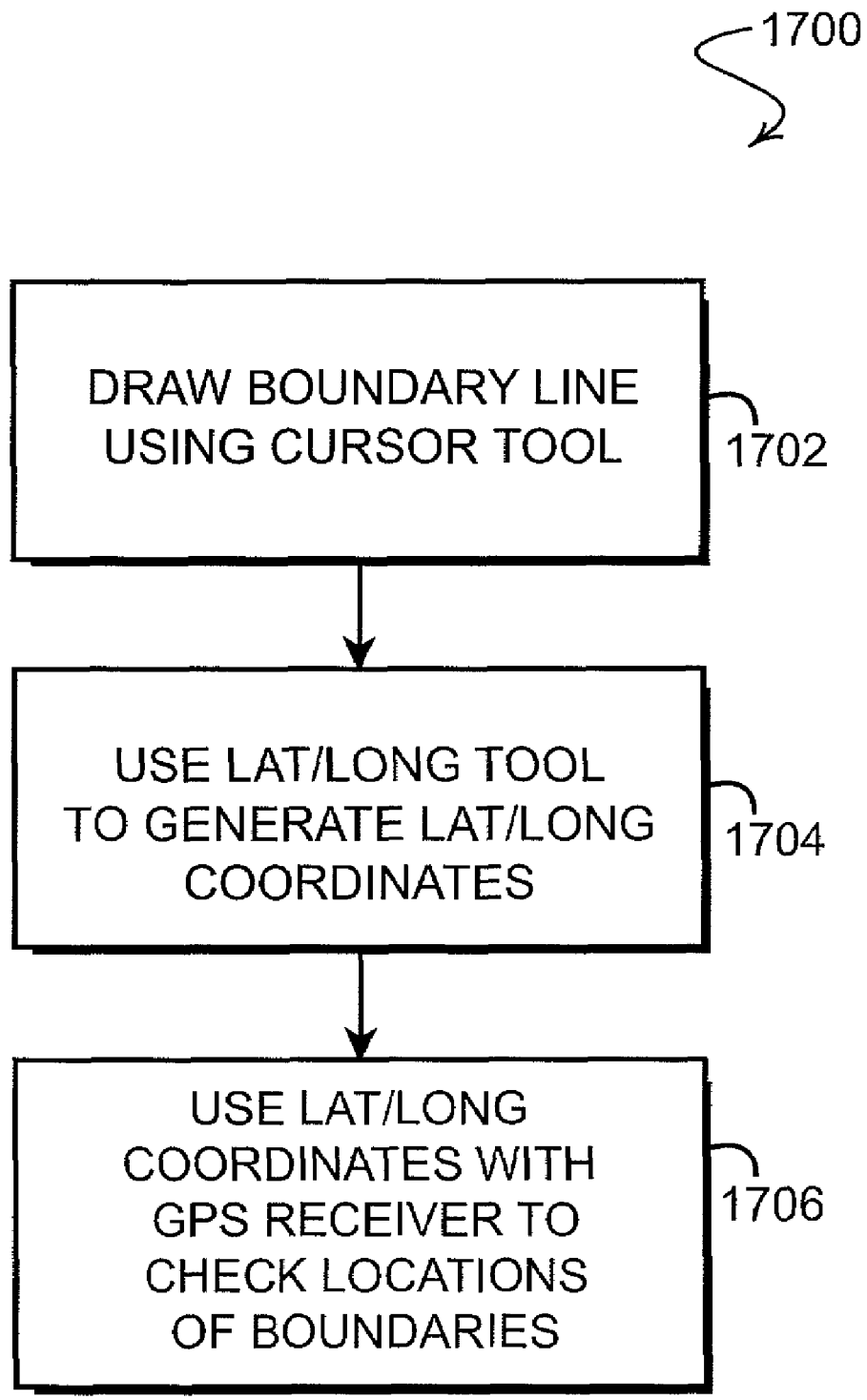
FIG. 17 is a flow diagram that illustrates one manner in which the cursor tool may be used in conjunction with the lat/long tool.

FIG. 17 discloses a flow diagram 1700 that illustrates the manner in which the cursor tool and lat/long tool can be used in conjunction with a GPS receiver. At step 1702, a user can draw a boundary line using the cursor tool. Again, the UTM coordinates are recorded for the drawn boundaries. At step 1704, the lat/long tool is activated by the user to generate lat/long coordinates that are produced in a lat/long coordinate table, such as disclosed in FIG. 10. At step 1706, the user can then load the lat/long coordinates as way points in the GPS receiver to check the locations of the boundaries on the property. In this manner, an actual physical property line can be created by the user.

Figure 18:
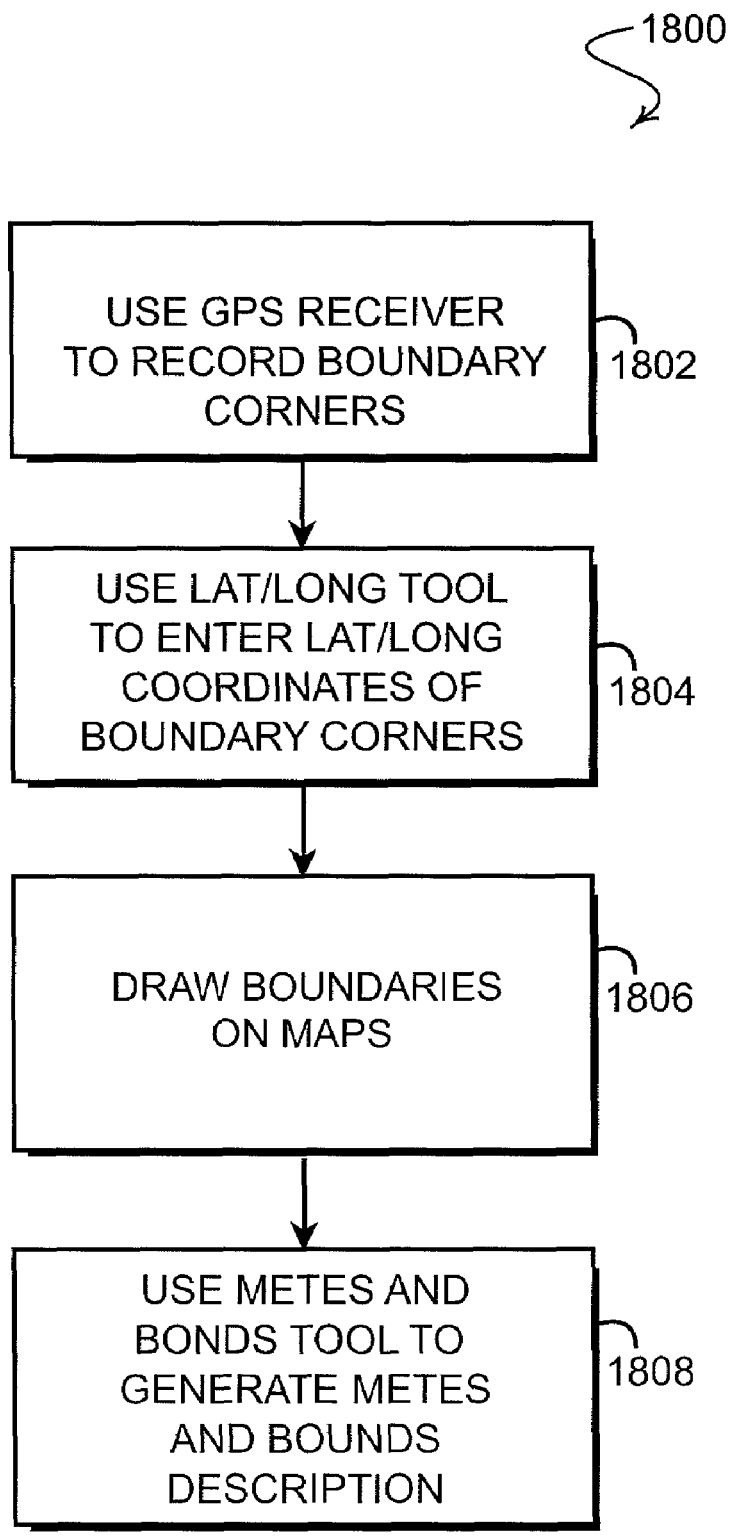
FIG. 18 is a flow diagram that illustrates the manner in which a GPS receiver can be used in conjunction with the lat/long tool and the metes and bounds tool.

FIG. 18 discloses the process steps 1800 for utilizing a GPS receiver in conjunction with the lat/long tool to draw boundaries on the network access tool maps and images and to further generate metes and bounds descriptions. At step 1802, the user can record GPS way points during a physical inspection of the property using a GPS receiver. At step 1804, these way points recorded in the GPS receiver can be recorded in the lat/long table illustrated in FIG. 10 by employing the lat/long tool of the network access tool. The lat/long tool can then generate boundaries on the map and image data at step 1806, which causes UTM coordinates to be recorded by the network accessible tool. The metes and bounds tool can then be activated at step 1808 to generate a metes and bounds description, such as shown in FIG. 11, using the recorded UTM coordinates.

Figure 19:
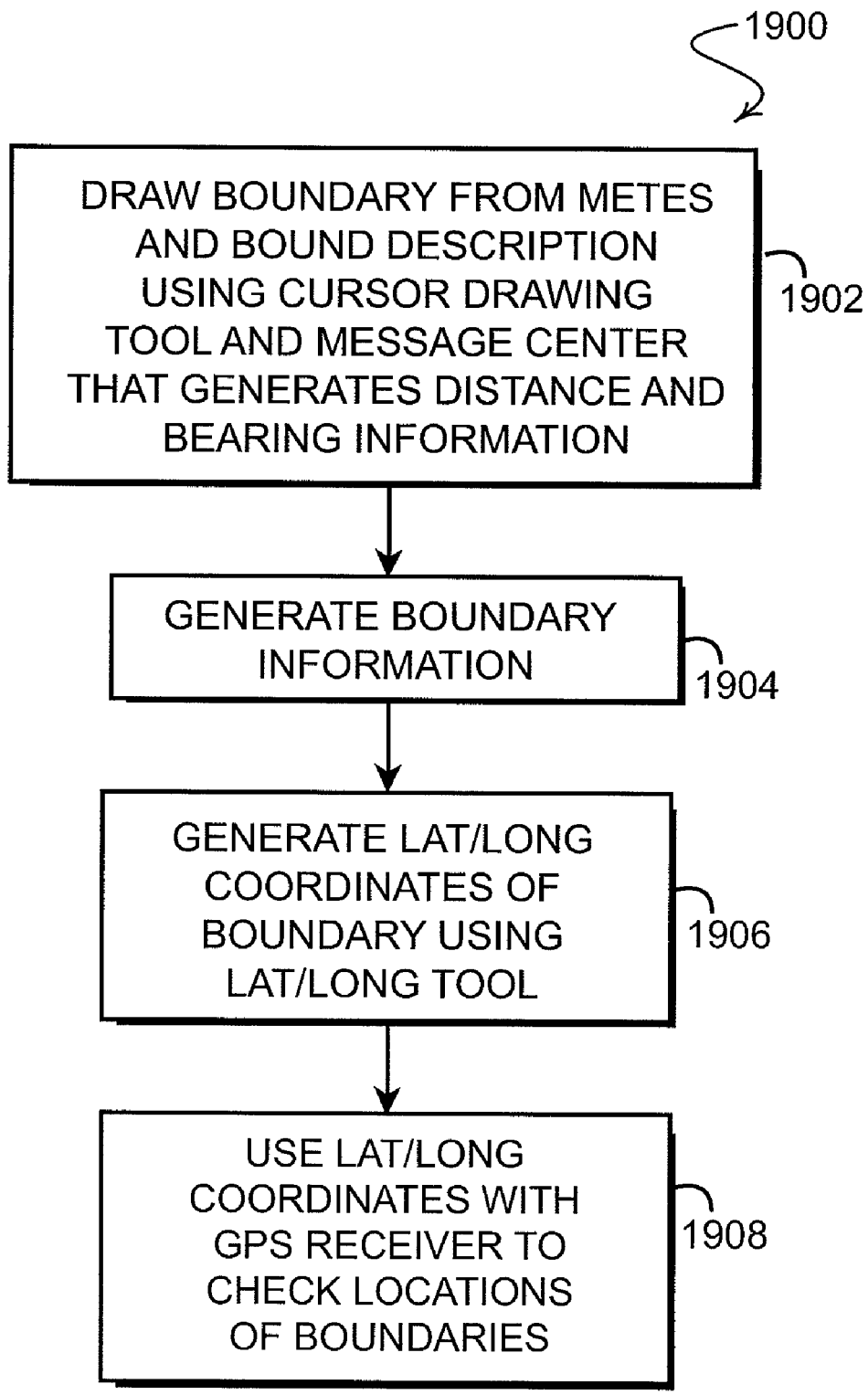
FIG. 19 is a flow diagram illustrating the manner in which the cursor drawing tool can be used in conjunction with the lat/long tool and a GPS receiver.

FIG. 19 is a flow diagram 1900 illustrating the use of the cursor drawing tool, lat/long tool and a GPS receiver. At step 1902, a boundary is drawn by a user from a metes and bounds description using the cursor drawing tool. The user places the cursor on the starting point and then uses the bearing and distance information that is displayed in the message center to generate a boundary from a metes and bounds description. At step 1904, the network accessible tool generates the boundary information and records the boundary information as UTM coordinates. At step 1906, the lat/long tool is activated which generates lat/long coordinates from the UTM coordinates and produces a table such as disclosed in FIG. 10. At step 1908, the lat/long coordinates are entered as way points in the GPS receiver, either manually or automatically, so that the user can then physically check the location of the boundary.

The present invention therefore overcomes the disadvantages and limitations of the prior art by providing a tool that has a comprehensive set of functions that supply information relating to land over a network and that can be operated in a simple and easy fashion by technical or non-technical users. The comprehensive set of functions allow a user to locate, identify, define, measure, view and communicate information relating to land. The term "land" may include a parcel of land, a property, an easement, a tract, a lot and block ownership rights, a right-of-way, a mineral right, a water right, a lease, vegetation, a geographical area of interest, land operation and management, the physical characteristics of land, the political aspects of land and the physical location of natural and man-made objects and structures built on the land or to be built on the land.

The present invention therefore provides a network accessible tool that is capable of performing a wide variety of functions relating to maps, satellite imagery and other image data relating to land to define, measure and communicate information. The network accessible tool organizes and searches a large database of image and other information. Locating, panning and zooming can be performed by using the techniques disclosed in U.S. patent application Ser. No. 10/408,757 by James J. Graham, Dallen Campbell, and Craig D. Harrison entitled "Web Imaging Serving Technology," which was based upon and claims the benefit of U.S. Provisional Patent Application Ser. No. 60/370,083 by James J. Graham and Dallen Campbell entitled "Web Imaging Serving Technology," and which is specifically incorporated herein by reference for all that it discloses and teaches. Information can include title documents, geographical maps and surveys, satellite images, and photo images from the ground. The network accessible tool assists the user in locating and viewing the land, defining information relating to the land, and communicating that information. The network accessible tool provides a unique land information resource that allows the user to locate, delineate boundaries and retrieve geographical information. It can be used in selling, buying, developing, subdividing, lending, insuring, surveying, determining ownership rights and various other functions such as planning and research with respect to land. It can be used by surveyors, engineers, appraisers, title companies, customers, sellers, brokers, etc. Various tools provided by the network accessible tool work together, synergistically to provide improved functionality. Also, map data, satellite image data, photographic data or other information and data that may relate to land, can be provided by a network accessible tool that is simple and easy to use by non-technical users using commonly available browsers. For example, the network accessible tool of the present invention allows users to easily locate land in various ways. For example, a scrolling tool can be used to simply scroll across a seamless set of map or photographic data, using various scales, until the land is identified and located. Further, geographical names can be entered into the tool to locate land. Also, latitude and longitude locations can be entered as well as township, range and section information, county, city name, other geographical features or zip code to locate the land.

Since the software tool of the present invention is accessible over the Internet, or any network, through various connections, including wireless connections, multiple users can access and operate the tool. As such, it is easy to access by any one connected to the Internet. It provides a combination of maps and other image data such as satellite image data or aerial photography that is mosaic or stitched together in a seamless data set. The network accessible tool allows scrolling across these seamless data sets and toggling from one image set to another to assist in locating and zooming on properties of interest. Many systems require refreshing of the screen when moving from an adjacent map area. This is not required with the network accessible tool of the present invention.

The network accessible tool of the present invention assists users in locating the land using a geographical name, township, range and section, county, lat/long coordinates, and zip code searches. The geographical name search is highly useful when little is known about the particular land to be located. Names can be used such as nearby lakes, parks, towns, geographical features, etc. The system uses the Geographic Name Information System that has over 1.9 million entries. Township, range and section searches, as well as county and zip codes, will provide displays on various scales of USGS maps. Lat/long coordinate pair entries provide very accurate location of land.

Once the land has been located, the land can be identified and defined by providing a boundary drawing tool. The boundary drawing tool can allow the user to circumscribe a parcel of land using an entry device, such as a mouse, to control a cursor on the displayed data to draw the boundary and edit the boundary in any desired manner. For example, a parcel can be edited by relocating the parcel to a new position while maintaining the shape of the parcel. Also, a parcel can be adjusted to match a desired size by adjusting the location of the boundaries while viewing the output of the acreage calculator, as described below. Further, metes and bounds descriptions can be entered into the network accessible tool which will generate the boundary information automatically on the map and image data. Also, the latitude and longitude coordinates of the corner points of the land can be entered which allows the drawing tool to circumscribe the boundaries of the land automatically. The drawing tool can also be used to measure point-to-point distances or circumscription distances. Further, the drawing tool can be used to circumscribe a parcel of land and then generate a table of lat/long corner points for the circumscribed land, or generate a metes and bounds table that describes the land. In addition, the lat/long tool can be used to generate a table of lat/long coordinates of corner points of a boundary that has been entered using either the metes and bounds tool or the cursor drawing tool.

The network accessible tool of the present invention also allows for mouse controlled panning, zooming and scrolling. The mouse can be used to switch scales of various image data such as map or images to allow for zooming. Further, boundaries can be drawn on the screen and can be entered using metes and bounds descriptions, lat/long corners or visually by the user. The network accessible tool of the present invention can calculate total acreage within a boundary, measure perimeter distances and can measure distances of legs between corner points. Images can be printed, e-mailed, downloaded as JPEG or PDF files and stored in a password protected land website.

The present invention also allows for affiliate advertising, which increases the widespread use of the network accessible tool. Affiliates provide a "Free Map" or other promotional item on the affiliate's page. Typically, affiliates comprise businesses that deal with land or some aspect relating to land in some fashion, such as brokering, researching, planning, management, development, etc. The "Free Map" or other promotional item links the user to the host provider. The link includes an affiliate I.D. that causes the network accessible tool to generate graphics that are displayed to the user that identify the affiliate. In this manner, the host provider is transparent and it appears that the affiliate is providing the easily accessible user-friendly network accessible tool to the user. Exiting of the network accessible tool can cause the user to link back directly to an affiliate's web page such as a home page. In addition, the user may select a "Save to Desktop" button on the network accessible tool so that the tool automatically generates an icon, which is displayed on the users desktop. The icon indicates the affiliate's name. In this fashion, affiliates are able to provide the entire functionality of the network accessible tool and thereby promote an image of a high degree of professionalism to a user through no cost of the affiliate. In fact, the affiliate can be paid a percentage of the image data that is purchased by a user by the host provider. In this fashion, a large number of affiliates can be associated with the network accessible tool to greatly increase the use of the network accessible tool.

The network accessible tool of the present invention is very user friendly. The manner of operating the network accessible tool is intuitive. In addition, it can be used in many different ways to solve problems. For example, a user can enter a metes and bounds description into the metes and bounds tool of the network accessible tool. The metes and bounds tool draws boundaries on a digital map image. The lat/long coordinates for each of the corner points is provided in the message center. The lat/long coordinate pairs can then be entered into a GPS receiver as waypoints so that a user can then walk the land to determine the corner points. A map of the land can also be generated that is positioned within a framed window so that the user can view the relevant portions of the land while walking the land.

As another example, a written description of the land may not match what is shown on the map. For example, one edge of the land may be defined by a road, which was not shown on the map information, since the map was made prior to the time that the road was constructed. The user can toggle to more recent image data to draw the boundary on the image data. The boundary is then transferred to the map automatically and is displayed on all of the map and imagery that is provided by the network accessible tool.

Also, information on one set of data can be viewed on other sets of data. For example, "boundary information" can include a location on a map, such as an "x," a distance measurement, a circumscribed piece of property, a shaded area, or other identifying information. Such boundary information recorded on a map that has a predetermined scale is also viewable on other map and image data that may have different scales. This is achieved by using georeferenced global coordinate information, such as latitude and longitude coordinates, or UTM coordinates that are associated with each set of data. This feature allows users to toggle from one set of data to another to locate and verify land boundaries, distance measurements, or locations.

In addition, the network accessible tool provides for the display of a cursor on the map and image data that can be moved using a standard device such as a mouse. As the cursor is moved across the map and image data, information regarding the particular location can be provided on a separate message screen, or on the display screen. Information such as the latitude and longitude location of the cursor, the identification of the map that is being accessed or imagery that is being accessed, the date of the map or image data, etc. can be provided. Also, bearing, distance and direction information can be provided either on the message center or on the screen, or both. This allows for multiple users to have verbal interactive sessions wherein cursor movement can be verbally described for other users to control their cursors while viewing the message center to enter boundary data or go to locations based upon such verbal description. Information, such as boundary data, can also be e-mailed between users to assist in this endeavor.

Also, the network accessible tool can be used to communicate information. For example, maps and other information can be printed, downloaded, e-mailed to other parties in a simple and easy manner. Also, the information can be downloaded and stored so that it can be used and further customized by the user. Further, the information generated by the user can be used to generate a land website in accordance with U.S. patent application Ser. No. 10/162,723 by Craig Harrison entitled "Identification, Storage and Display of Land Data on a Website," which was based upon and claims the benefit of U.S. Provisional Patent Application Ser. No. 60/336,258, entitled "Identification, Storage and Display of Land Data on a Website," filed Oct. 31, 2001, by Craig Harrison, and U.S. Provisional Patent Application Ser. No. 60/295,097, entitled "Identification, Storage and Display of Land Data on a Website," filed Jun. 1, 2001, by Craig Harrison, and which is specifically incorporated herein by reference for all that it discloses and teaches.

The present invention may be used for various purposes to archive and deliver land information to various people such as brokers, appraisers, lenders, developers, land owners, consultants, potential buyers, construction personnel making improvements on the property, government personnel making planning decisions, land managers, etc. In each of these cases, other additional data from the user or third parties can be provided on the land website. For example, legal documents can be provided relating to the land. In that regard, terms of the purchase can be provided together with leases, title abstracts, easements, rights of way and other legal documentation in a specific area set aside for e-documents. Additionally, the present invention can be implemented in a simple and easy fashion over the Internet which will allow users to readily access data for generating circumscribed boundaries and frame windows for viewing the property.

A further advantage of the present invention is that information relating to the property can be located in one convenient place, i.e. the land website. Customization modules allow users to add scanned and text documents, appraisals, reports, loan documents, photographs, third party maps and other information relating to the property. For example, using a customization module, which may part of an upgrade package, a user can change the web page style. If the user is attempting to sell a cattle ranch, the web page may display cattle and cowboys. If the property is somewhat mountainous with streams, the user may wish to have a web page that shows fly fishing. Further, a customization module may allow the user to upload photos to a photo gallery that is part of the web page. Also, the customization module may have a location for storing e-documents. For example, PDF documents relating to legal descriptions, easements, watershed studies, forestation, etc. may be scanned and stored in the e-document section. The e-document section may have multiple passwords for limited access. The documents can be stored in any desired format such as PDF format, Word, WordPerfect, jpeg images, etc. The customization module may also allow the user to add links to other locations. For example, if a question arises regarding a particular easement or right of way, a link to a particular treatise on easements and rights of way may be established by the user through the land library. Further, the customization module may allow the user to modify standard images such as jpeg images using available graphics software packages such as Microsoft Paint, and reload those modified images onto the website. Further, the customization model may allow the user to load third party maps onto the land website. Other information such as ideas, directions to the property, etc. can also be stored on the land website.

The network accessible tool is therefore capable of providing a very complete set of data that includes a seamless set of map data that employ a wide range of scales and a seamless set of aerial photography and satellite imagery that can cover the entire continental U.S. or any desired area in the world. In addition, flat raised relief topo-quads can be provided that have shading to indicate elevations as well as Bureau of Land Management (BLM) maps are provided that provide information relating to government ownership. Vegetation land cover and other information can also provided that is all accessible through the network accessible tool. Maps used for flying, including sectionals, weather maps, Victor airway maps, etc., can also be provided. A complete set of data is accessed through the network accessible tool that provides a very complete set of functions that allow a user to intuitively operate with a standard browser in a simple and easy fashion. All of this information is accessible over the network and can be communicated to other parties via e-mail, printed or downloaded by the user. The present invention operates in conjunction with standard browsers or can be further enhanced with downloadable plug-ins such as Acrobat from Adobe systems.

As another example, a researcher may be interested in studying a drainage basin in a particular state such as Wyoming. To perform these tasks the researcher would normally have to determine which quad maps cover the area of interest. After determining which quad maps were relevant, the researcher would then have to order those maps, which may take a number of days. After receiving the maps, the researcher would have to tape them together to view the entire drainage area of interest. By using the network accessible tool of the present invention, the researcher can simply type in the name of the closest city or geographical landmark in the location tool. The researcher can then scroll to the area of interest and toggle between various scale maps to obtain an image of the whole basin on the screen. The cursor drawing tool can then be used to draw a boundary around the drainage area. The acreage calculator can then calculate the acreage of that area. A map can then be printed which is framed within a frame window so that the relevant portions of the drainage area can be viewed in a simple and easy fashion with a seamless set of map data that has been digitally stitched together to provide a unified view of the area. As pointed out above, the seamless set of image data can include topo-quads, BLM maps, satellite imagery, aerial photography, land based photos and regional land use/vegetation satellite maps that are color coded to indicate vegetation.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of obtaining map identification information relating to a specific map in a set of digital maps stored on a host computer system in response to the location of a cursor using a cursor drawing tool that is part of an Internet accessible tool operating on said host computer system, said host computer system being connected to a network system such that users are allowed access to said Internet accessible tool through said network system comprising:

performing processes of said Internet accessible tool and said cursor drawing tool that is part of said Internet accessible tool on said host computer system, said processes performed on said host computer system comprising:

determining coordinates of said cursor on a screen displaying said set of digital maps by counting pixels from an origin point using said cursor drawing tool;

converting cursor screen coordinates to cursor geographic coordinates using said cursor drawing tool;

locating a correct row for said specific map in a plurality of rows of said set of digital maps by comparing said cursor geographic coordinates with minimum and maximum values of said plurality of rows using said cursor drawing tool;

locating a correct proximity location of said specific map by comparing said cursor geographic coordinates with minimum and maximum proximity values of maps in said correct row using said cursor drawing tool;

identifying said specific map by comparing said cursor geographic coordinates with map polygons for maps located in said correct proximity location using said cursor drawing tool;

retrieving stored map identification information relating to said specific map from said host computer system using said cursor drawing tool; and performing investigatory functions relating to said specific map using said map identification information in accordance with direction provided by a user using said Internet accessible tool such that said stored map identification information is used as a repository for said map identification information.

2. The method of claim 1 wherein said investigatory functions comprise at least one of the group consisting of: selling land, buying land, developing land, subdividing land, lending with respect to land, insuring with respect to land, determining ownership rights of land, surveying land, brokering land, appraising land, engineering with respect to land, planning with respect to land, researching land titles, financing land, performing an environmental audit, determining mineral rights of land, and determining water rights of land.

3. A method of obtaining map identification information relating to a specific map in a set of digital maps stored on a host computer system in response to the location of a cursor using a cursor drawing tool that is part of an Internet accessible tool operating on said host computer system, said host computer system being connected to a network system such that users are allowed access to said Internet accessible tool through said network system, comprising:

performing processes of said Internet accessible tool and said cursor drawing tool that is part of said Internet accessible tool on said host computer system, said processes performed on said host computer system comprising:

determining coordinates of said cursor on a screen displaying said set of digital maps by counting pixels from an origin point using said cursor drawing tool;

converting cursor screen coordinates to cursor geographic coordinates;

locating a correct row for said specific map in a plurality of rows of said set of digital maps by comparing said cursor geographic coordinates with minimum and maximum values of said plurality of rows using said cursor drawing tool;

locating a correct proximity location of said specific map by comparing said cursor geographic coordinates with minimum and maximum proximity values of maps in said correct row using said cursor drawing tool;

identifying said specific map by comparing said cursor geographic coordinates with map polygons for maps located in said correct proximity location using said cursor drawing tool;

retrieving stored map identification information relating to said specific map from said host computer system using said cursor drawing tool; and updating said stored map identification information relating to said specific map identified by said cursor screen coordinates as said cursor screen coordinates change due to said cursor being moved using said cursor drawing tool.

4. A method of obtaining map identification information relating to a specific map in a set of digital maps stored on a host computer system in response to the location of a cursor using a cursor drawing tool that is part of an Internet accessible tool operating on said host computer system, said host computer system being connected to a network system such that users are allowed access to said Internet accessible tool through said network system, comprising:

performing processes of said Internet accessible tool and said cursor drawing tool that is part of said Internet accessible tool on said host computer system, said processes performed on said host computer system comprising:

determining coordinates of said cursor on a screen displaying said set of digital maps by counting pixels from an origin point using said cursor drawing tool;

converting cursor screen coordinates to cursor geographic coordinates using said cursor drawing tool;

locating a correct row for said specific map in a plurality of rows of said set of digital maps by comparing said cursor geographic coordinates with minimum and maximum values of said plurality of rows using said cursor drawing tool;

locating a correct proximity location of said specific map by comparing said cursor geographic coordinates with minimum and maximum proximity values of maps in said correct row using said cursor drawing tool;

identifying said specific map by comparing said cursor geographic coordinates with map polygons for maps located in said correct proximity location using said cursor drawing tool; and retrieving stored map identification information relating to said specific map from said host computer system using said cursor drawing tool, wherein said stored map identification information comprises at least one of the group consisting of: map dates, image dates, map names, image names, and other map data.

5. The method of claim 4 further comprising displaying said stored map identification information in a message center section of said screen using said Internet accessible tool.

6. A method of obtaining land description data relating to land described by a specific map in a set of digital maps stored on a host computer system in response to the location of a cursor using a cursor drawing tool that is part of an Internet accessible tool operating on said host computer system, said host computer system being connected to a network system such that users are allowed access to said Internet accessible tool through said network system, comprising:

performing processes of said Internet accessible tool and said cursor drawing tool that is part of said Internet accessible tool on said host computer system, said processes performed on said host computer system comprising:

determining coordinates of said cursor on a screen displaying said set of digital maps by counting pixels from an origin point using said cursor drawing tool;

converting cursor screen coordinates to cursor geographic coordinates using said cursor drawing tool;

locating a correct row for said specific map in a plurality of rows of said set of digital maps by comparing said cursor geographic coordinates with minimum and maximum values of said plurality of rows using said cursor drawing tool;

locating a correct proximity location of said specific map by comparing said cursor geographic coordinates with minimum and maximum proximity values of maps in said correct row using said cursor drawing tool;

identifying said specific map by comparing said cursor geographic coordinates with map polygons for maps located in said correct proximity location using said cursor drawing tool; and retrieving said land description data described by said specific map from said host computer system using said cursor drawing tool.

7. The method of claim 6 wherein said land description data comprises at least one of the group consisting of: streaming video of said land, ground level photo images of said land, title documents relating to said land, mineral rights relating to said land, water rights relating to said land, physical features of said land, information relating to man-made objects and structures built on said land, information relating to man-made objects and structures to be built on said land, and other data relating to said land.

8. The method of claim 6 further comprising performing investigatory functions relating to said land described by said specific map in accordance with direction provided by a user using said Internet accessible tool.

9. The method of claim 8 wherein said investigatory functions comprise at least one of the group consisting of: selling land, buying land, developing land, subdividing land, lending with respect to land, insuring with respect to land, determining ownership rights of land, surveying land, brokering land, appraising land, engineering with respect to land, planning with respect to land, researching land titles, financing land, performing an environmental audit, determining mineral rights of land, and determining water rights of land.

10. A method of obtaining map description data relating to a specific map in a set of digital maps stored on a host computer system in response to the location of a cursor using a cursor drawing tool that is part of an Internet accessible tool operating on said host computer system, said host computer system being connected to a network system such that users are allowed access to said Internet accessible tool through said network system, comprising:

performing processes of said Internet accessible tool and said cursor drawing tool that is part of said Internet accessible tool on said host computer system, said processes performed on said host computer system comprising:

determining coordinates of said cursor on a screen displaying said set of digital maps by counting pixels from an origin point using said cursor drawing tool;

converting cursor screen coordinates to cursor geographic coordinates using said cursor drawing tool;

locating a correct row for said specific map in a plurality of rows of said set of digital maps by comparing said cursor geographic coordinates with minimum and maximum values of said plurality of rows using said cursor drawing tool;

locating a correct proximity location of said specific map by comparing said cursor geographic coordinates with minimum and maximum proximity values of maps in said correct row using said cursor drawing tool;

identifying said specific map by comparing said cursor geographic coordinates with map polygons for maps located in said correct proximity location using said cursor drawing tool; and retrieving stored map description data relating to said specific map from said host computer system using said cursor drawing tool.

11. The method of claim 10 wherein said stored map description data comprises at least one of the group consisting of: nearest elevation with respect to said cursor geographic coordinates, nearby geographical features with respect to said cursor geographic coordinates, map legends, and map scale.

12. The method of claim 11 wherein said nearby geographical features comprise at least one of the group consisting of: lakes, parks, towns, natural objects, man-made objects, structures built on the land, and structures planned to be built on the land.

13. The method of claim 10 further comprising performing investigatory functions relating to said map description data of said specific map in accordance with direction provided by a user using said Internet accessible tool.

14. The method of claim 13 wherein said investigatory functions comprise at least one of the group consisting of: selling land, buying land, developing land, subdividing land, lending with respect to land, insuring with respect to land, determining ownership rights of land, surveying land, brokering land, appraising land, engineering with respect to land, planning with respect to land, researching land titles, financing land, performing an environmental audit, determining mineral rights of land, and determining water rights of land.

15. A method of obtaining location description data relating to a specific map in a set of digital maps stored on a host computer system in response to the location of a cursor using a cursor drawing tool that is part of an Internet accessible tool operating on said host computer system, said host computer system being connected to a network system such that users are allowed access to said Internet accessible tool through said network system, comprising:

performing processes of said Internet accessible tool and said cursor drawing tool that is part of said Internet accessible tool on said host computer system, said processes performed on said host computer system comprising:

determining coordinates of said cursor on a screen displaying said set of digital maps by counting pixels from an origin point using said cursor drawing tool;

converting cursor screen coordinates to cursor geographic coordinates;

locating a correct row for said specific map in a plurality of rows of said set of digital maps by comparing said cursor geographic coordinates with minimum and maximum values of said plurality of rows using said cursor drawing tool;

locating a correct proximity location of said specific map by comparing said cursor geographic coordinates with minimum and maximum proximity values of maps in said correct row using said cursor drawing tool;

identifying said specific map by comparing said cursor geographic coordinates with map polygons for maps located in said correct proximity location using said cursor drawing tool; and retrieving said location description data relating to said specific map from said host computer system using said cursor drawing tool.

16. The method of claim 8 wherein said location description data comprises at least one of the group consisting of: latitude and longitude coordinates; Universal Transverse Mercator (UTM) coordinates; county; postal code; parcel; tract; lot and block; and township, range and section.

17. The method of claim 16 further comprising updating said location description data identified by said cursor screen coordinates as said cursor screen coordinates change due to said cursor being moved using said cursor drawing tool.

18. The method of claim 17 further comprising displaying said location description data in a message center section of said screen using said Internet accessible tool.

19. The method of claim 15 further comprising performing investigatory functions relating to location description data of said specific map in accordance with direction provided by a user using said Internet accessible tool.

20. The method of claim 19 wherein said investigatory functions comprise at least one of the group consisting of: selling land, buying land, developing land, subdividing land, lending with respect to land, insuring with respect to land, determining ownership rights of land, surveying land, brokering land, appraising land, engineering with respect to land, planning with respect to land, researching land titles, financing land, performing an environmental audit, determining mineral rights of land, and determining water rights of land.

21. A method of obtaining e-documents relating to a specific map in a set of digital maps stored on a host computer system in response to the location of a cursor using a cursor drawing tool that is part of an Internet accessible tool operating on said host computer system, said host computer system being connected to a network system such that users are allowed access to said Internet accessible tool through said network system, comprising:

performing processes of said Internet accessible tool and said cursor drawing tool that is part of said Internet accessible tool on said host computer system, said processes performed on said host computer system comprising:

determining coordinates of said cursor on a screen displaying said set of digital maps by counting pixels from an origin point using said cursor drawing tool;

converting cursor screen coordinates to cursor geographic coordinates using said cursor drawing tool;

locating a correct row for said specific map in a plurality of rows of said set of digital maps by comparing said cursor geographic coordinates with minimum and maximum values of said plurality of rows using said cursor drawing tool;

locating a correct proximity location of said specific map by comparing said cursor geographic coordinates with minimum and maximum proximity values of maps in said correct row using said cursor drawing tool;

identifying said specific map by comparing said cursor geographic coordinates with map polygons for maps located in said correct proximity location using said cursor drawing tool; and retrieving stored e-documents relating to said land described by said specific map from said host computer system using said cursor drawing tool.

22. The method of claim 21 wherein said stored e-documents comprise at least one of the group consisting of: title abstracts, deed information, legal descriptions, leases, rights-of-way, surveys, watershed studies, easements, loan information, appraisal reports, grazing leases, insurance, conservation easements, ownership rights, and public land leases.

23. The method of claim 21 further comprising performing investigatory functions relating to e-documents of said specific map in accordance with direction provided by a user using said Internet accessible tool.

24. The method of claim 23 wherein said investigatory functions comprise at least one of the group consisting of: selling land, buying land, developing land, subdividing land, lending with respect to land, insuring with respect to land, determining ownership rights of land, surveying land, brokering land, appraising land, engineering with respect to land, planning with respect to land, researching land titles, financing land, performing an environmental audit, determining mineral rights of land, and determining water rights of land.

25. A method of locating a boundary on a plurality of digital maps and images stored on a host computer system using an Internet accessible tool operating on said host computer system, said host computer system being connected to a network system such that users are allowed access to said Internet accessible tool through said network system, comprising:

performing processes of said Internet accessible tool on said host computer system, said processes performed on said host computer system comprising:

obtaining a first digital map with said boundary overlaid on said first digital map, wherein said boundary is comprised of a plurality of boundary points delineating screen coordinates of said boundary on said first digital map using said Internet accessible tool;

analyzing said screen coordinates of said plurality of boundary points using said Internet accessible tool;

generating geographic coordinates for said plurality of boundary points in response to analysis of said screen coordinates using said Internet accessible tool;

generating lines between said geographic coordinates of said plurality of boundary points to produce boundary lines of said boundary using said Internet accessible tool;

displaying said boundary lines using said Internet accessible tool;

displaying said plurality of boundary points and said boundary lines at corresponding geographic locations on additional digital maps and images using said Internet accessible tool;

toggling between said additional digital maps and images to view locations of said plurality of boundary points and said boundary lines on said additional digital maps and images using said Internet accessible tool; and adjusting said locations of said plurality of boundary points, as needed, to accurately locate said plurality of boundary points on said first digital map and said additional digital maps and images using said Internet accessible tool.

26. The method of claim 25 further comprising providing access to said method of locating said boundary on said plurality of digital maps and images to a user over an Internet connection for a fee.

27. The method of claim 26 wherein said fee comprises at least one of the group consisting of: a periodic subscription fee permitting unlimited use of said method of generating a boundary on a digital map and a periodic subscription fee permitting limited use of said method of generating a boundary on a digital map.

28. The method of claim 26 further comprising paying said fee by credit card using secure processes over said Internet connection through said Internet accessible tool.

29. A method of locating a boundary point on a plurality of digital maps and images stored on a host computer system using an Internet accessible tool operating on said host computer system, said host computer system being connected to a network system such that users are allowed access to said Internet accessible tool though said network system, comprising:
performing processes of said Internet accessible tool on said host computer system, said processes performed on said host computer system comprising:
obtaining a first digital map with said boundary point overlaid on said first digital map, wherein said boundary point has screen coordinates on said first digital map using said Internet accessible tool;
analyzing said screen coordinates of said boundary point using said Internet accessible tool;
generating geographic coordinates for said boundary point in response to analysis of said screen coordinates using said Internet accessible tool;
displaying said boundary point at a corresponding geographic location on additional digital maps and images using said Internet accessible tool;
toggling between said additional digital maps and images to view the location of said boundary point on said additional digital maps and images using said Internet accessible tool; and
adjusting said location of said boundary point, as needed, to accurately locate said boundary point on said first digital map and said additional digital maps and images using said Internet accessible tool.

30. The method of claim 29 further comprising providing access to said method of locating said boundary point on said plurality of digital maps and images to a user over an Internet connection for a fee.

31. The method of claim 30 wherein said fee comprises at least one of the group consisting of: a periodic subscription fee permitting unlimited use of said method of generating a boundary on a digital map and a periodic subscription fee permitting limited use of said method of generating a boundary on a digital map.

32. The method of claim 30 further comprising paying said fee by credit card using secure processes over said Internet connection through said Internet accessible tool.

33. A method of generating a boundary on a digital map using a cursor by using a cursor drawing tool that is part of an Internet accessible tool operating on a host computer system, said host computer system being connected to a network system such that users are allowed access to said Internet accessible tool through said network system, comprising:
performing processes of said Internet accessible tool on said host computer system, said processes performed on said host computer system comprising:
generating an initial boundary point by activation of said cursor at an initial location on said digital map by clicking a mouse using said cursor drawing tool;
analyzing screen coordinates of said initial boundary point using said cursor drawing tool;
generating geographic coordinates for said initial boundary point in response to analysis of said screen coordinates using said cursor drawing tool;
drawing said boundary from said initial boundary point using a said cursor drawing tool;
analyzing screen coordinates of said boundary drawn by said cursor drawing tool;
generating additional boundary points for said boundary in response to analysis of said boundary drawn by said cursor drawing tool;
analyzing screen coordinates of said additional boundary points using said cursor drawing tool;
generating geographic coordinates for said additional boundary points using said cursor drawing tool; and
generating boundary lines between said geographic coordinates of said initial and additional boundary points using said cursor drawing tool.

34. The method of claim 33 further comprising deleting a subset of boundary points from said boundary points of said boundary after said boundary is completed and redrawing said boundary accordingly using said cursor drawing tool.

35. The method of claim 33 further comprising adding a subset of boundary points to said boundary points of said boundary after said boundary is completed and redrawing said boundary accordingly using said cursor drawing tool.

36. The method of claim 33 further comprising panning across said digital map to assist in creating and editing said boundary using said cursor drawing tool.

37. The method of claim 36 wherein said process of panning across said digital map to assist in creating and editing said boundary is performed while continuously creating and editing said boundary and without deselecting said cursor drawing tool.

38. The method of claim 33 further comprising:
first searching geographic databases accessible on said Internet to locate said digital map that shows an area of interest for said boundary to be generated on said digital map using said cursor drawing tool; and
viewing said area of interest on said digital map prior to generating said boundary on said digital map using said cursor drawing tool.

39. The method of claim 33 wherein navigation to said Internet accessible tool is provided through an affiliate website.

40. The method of claim 33 further comprising creating a land website to store said boundary using said Internet accessible tool.

41. The method of claim 33 further comprising selecting said digital map from a set of digital maps presented in a map gallery using said Internet accessible tool.

42. The method of claim 33 wherein said boundary points are connected as a series of said boundary lines, said series of said boundary lines having a line beginning and a line ending delineated by a beginning boundary point and an ending boundary point, said beginning boundary point and said ending boundary point match, and each boundary line of said boundary lines being generated and displayed as said boundary points are added using said cursor drawing tool.

43. The method of claim 33 wherein said boundary points are connected as a series of said boundary lines, said series of said boundary lines having a line beginning and a line ending delineated by a beginning boundary point and an ending boundary point, said beginning boundary point and said ending boundary point do not match, and each boundary line of said boundary lines being generated and displayed as said boundary points are added using said cursor drawing tool.

44. The method of claim 33 wherein said boundary points are connected as a series of said boundary lines and said boundary lines do not cross, each boundary line of said boundary lines being generated and displayed as said boundary points are added using said cursor drawing tool.

45. The method of claim 33 further comprising:
saving said boundary to computer readable storage media using said Internet accessible tool;
exiting said Internet accessible tool;
starting said Internet accessible tool; and
re-opening said boundary in said Internet accessible tool.

46. The method of claim 45 further comprising:
editing said boundary after re-opening said boundary with said Internet accessible tool such that said boundary may be saved and edited as needed.

47. The method of claim 33 further comprising providing access to said method of generating said boundary on said digital map using said cursor to a user over an Internet connection for a fee.

48. The method of claim 47 wherein said fee comprises at least one of the group consisting of: a periodic subscription fee permitting unlimited use of said method of generating a boundary on a digital map and a periodic subscription fee permitting limited use of said method of generating a boundary on a digital map.

49. The method of claim 31 further comprising paying said fee by credit card using secure processes over said Internet connection through said Internet accessible tool.

50. A method of using an Internet accessible tool operating on a host computer system to generate a boundary on a digital map using a cursor, said host computer system being connected to a network system such that users are allowed access to said Internet accessible tool through said network system, comprising:
performing processes of said Internet accessible tool on said host computer system, said processes performed on said host computer system comprising:
generating an initial boundary point using said Internet accessible tool by activation of said cursor at an initial location on said digital map by clicking a mouse using said Internet accessible tool;
analyzing screen coordinates of said initial boundary point using said Internet accessible tool;
generating geographic coordinates for said initial boundary point in response to analysis of said screen coordinates using said Internet accessible tool;
generating additional boundary points by activation of said cursor at additional locations on said digital map by clicking a mouse using said Internet accessible tool;
analyzing screen coordinates of said additional boundary points using said Internet accessible tool;
generating geographic coordinates for said additional boundary points using said Internet accessible tool;
generating lines between said geographic coordinates of said initial and additional boundary points using said Internet accessible tool; and
providing access to said method of using an Internet accessible tool to generate a boundary on a digital map using a cursor to a user over an Internet connection for a fee.

51. The method of claim 50 wherein said fee comprises at least one of the group consisting of: a periodic subscription fee permitting unlimited use of said method of generating a boundary on a digital map and a periodic subscription fee permitting limited use of said method of generating a boundary on a digital map.

52. The method of claim 50 further comprising paying said fee by credit card using secure processes over said Internet connection through said Internet accessible tool.

53. A method of generating a boundary on a digital map using geographic coordinates of a plurality of corner points of said boundary using an Internet accessible tool operating on a host computer system, said host computer system being connected to a network system such that users are allowed access to said Internet accessible tool through said network system, comprising:
performing processes of said Internet accessible tool on said host computer system, said processes performed on said host computer system comprising:
generating a geographic coordinates table and entering said geographic coordinates of said plurality of corner points of said boundary in said geographic coordinates table into said Internet accessible tool;
locating coordinates of said plurality of corner points of said boundary on said digital map by reference to an origin point, said coordinates corresponding to adjacent geographic coordinates using said Internet accessible tool; and
generating lines between said coordinates to display said boundary on said digital map using said Internet accessible tool.

54. A computer readable storage medium that stores an Internet accessible tool, said Internet accessible tool containing instructions for a computer system to perform processes to obtain map identification information relating to a specific map in a set of digital maps in response to a location of a cursor, said processes comprising:
determining coordinates of said cursor on a screen displaying said set of digital maps by counting pixels from an origin point;
converting cursor screen coordinates to cursor geographic coordinates;
locating a correct row for said specific map in a plurality of rows of said set of digital maps by comparing said cursor geographic coordinates with minimum and maximum values of said plurality of rows;
locating a correct proximity location of said specific map by comparing said cursor geographic coordinates with minimum and maximum proximity values of maps in said correct row;
identifying said specific map by comparing said cursor geographic coordinates with map polygons for maps located in said correct proximity location;
retrieving stored map identification information relating to said specific map.

55. A computer readable storage medium that stores an Internet accessible tool, said Internet accessible tool containing instructions for a computer system to perform processes to obtain map identification information relating to a specific map in a set of digital maps in response to a location of a cursor, said processes comprising:
determining coordinates of said cursor on a screen displaying said set of digital maps by counting pixels from an origin point;
converting cursor screen coordinates to cursor geographic coordinates;
locating a correct row for said specific map in a plurality of rows of said set of digital maps by comparing said cursor geographic coordinates with minimum and maximum values of said plurality of rows;

locating a correct proximity location of said specific map by comparing said cursor geographic coordinates with minimum and maximum proximity values of maps in said correct row;

identifying said specific map by comparing said cursor geographic coordinates with map polygons for maps located in said correct proximity location;

retrieving stored map identification information relating to said specific map;

using said stored map identification information as a repository for said map identification information; and performing investigatory functions relating to said specific map in accordance with direction provided by a user.

56. A computer readable storage medium that stores an Internet accessible tool, said Internet accessible tool containing instructions for a computer system to perform processes to obtain map identification information relating to a specific map in a set of digital maps in response to a location of a cursor, said processes comprising:

determining coordinates of said cursor on a screen displaying said set of digital maps by counting pixels from an origin point;

converting cursor screen coordinates to cursor geographic coordinates;

locating a correct row for said specific map in a plurality of rows of said set of digital maps by comparing said cursor geographic coordinates with minimum and maximum values of said plurality of rows;

locating a correct proximity location of said specific map by comparing said cursor geographic coordinates with minimum and maximum proximity values of maps in said correct row;

identifying said specific map by comparing said cursor geographic coordinates with map polygons for maps located in said correct proximity location;

retrieving stored map identification information relating to said specific map; and updating said stored map identification information relating to said specific map identified by said cursor screen coordinates as said cursor screen coordinates change due to said cursor being moved.

57. A computer readable storage medium that stores an Internet accessible tool, said Internet accessible tool containing instructions for a computer system to perform processes to obtain map identification information relating to a specific map in a set of digital maps in response to a location of a cursor, said processes comprising:

determining coordinates of said cursor on a screen displaying said set of digital maps by counting pixels from an origin point;

converting cursor screen coordinates to cursor geographic coordinates;

locating a correct row for said specific map in a plurality of rows of said set of digital maps by comparing said cursor geographic coordinates with minimum and maximum values of said plurality of rows;

locating a correct proximity location of said specific map by comparing said cursor geographic coordinates with minimum and maximum proximity values of maps in said correct row;

identifying said specific map by comparing said cursor geographic coordinates with map polygons for maps located in said correct proximity location; and retrieving stored map identification information relating to said specific map, wherein said stored map identification information comprises at least one of the group consisting of: map dates, image dates, map names, image names, and other map data.

58. A computer readable storage medium that stores an Internet accessible tool, said Internet accessible tool containing instructions for a computer system to perform processes to obtain land description data relating to land described by a specific map in a set of digital maps in response to a location of a cursor, said processes comprising:

determining coordinates of said cursor on a screen displaying said set of digital maps by counting pixels from an origin point;

converting cursor screen coordinates to cursor geographic coordinates;

locating a correct row for said specific map in a plurality of rows of said set of digital maps by comparing said cursor geographic coordinates with minimum and maximum values of said plurality of rows;

locating a correct proximity location of said specific map by comparing said cursor geographic coordinates with minimum and maximum proximity values of maps in said correct row;

identifying said specific map by comparing said cursor geographic coordinates with map polygons for maps located in said correct proximity location; and retrieving said land description data described by said specific map.

59. A computer readable storage medium that stores an Internet accessible tool, said Internet accessible tool containing instructions for a computer system to perform processes to obtain map description data relating to a specific map in a set of digital maps in response to a location of a cursor, said processes comprising:

determining coordinates of said cursor on a screen displaying said set of digital maps by counting pixels from an origin point;

converting cursor screen coordinates to cursor geographic coordinates;

locating a correct row for said specific map in a plurality of rows of said set of digital maps by comparing said cursor geographic coordinates with minimum and maximum values of said plurality of rows;

locating a correct proximity location of said specific map by comparing said cursor geographic coordinates with minimum and maximum proximity values of maps in said correct row;

identifying said specific map by comparing said cursor geographic coordinates with map polygons for maps located in said correct proximity location; and retrieving stored map description data relating to said specific map.

60. A computer readable storage medium that stores an Internet accessible tool, said Internet accessible tool containing instructions for a computer system to perform processes to obtain location description data relating to a specific map in a set of digital maps in response to a location of a cursor, said processes comprising:

determining coordinates of said cursor on a screen displaying said set of digital maps by counting pixels from an origin point;

converting cursor screen coordinates to cursor geographic coordinates;

locating a correct row for said specific map in a plurality of rows of said set of digital maps by comparing said cursor geographic coordinates with minimum and maximum values of said plurality of rows;

locating a correct proximity location of said specific map by comparing said cursor geographic coordinates with minimum and maximum proximity values of maps in said correct row;

identifying said specific map by comparing said cursor geographic coordinates with map polygons for maps located in said correct proximity location; and retrieving said location description data relating to said specific map.

61. A computer readable storage medium that stores an Internet accessible tool, said Internet accessible tool containing instructions for a computer system to perform processes to obtain e-documents relating to a specific map in a set of digital maps in response to a location of a cursor, said processes comprising:

determining coordinates of said cursor on a screen displaying said set of digital maps by counting pixels from an origin point;

converting cursor screen coordinates to cursor geographic coordinates;

locating a correct row for said specific map in a plurality of rows of said set of digital maps by comparing said cursor geographic coordinates with minimum and maximum values of said plurality of rows;

locating a correct proximity location of said specific map by comparing said cursor geographic coordinates with minimum and maximum proximity values of maps in said correct row;

identifying said specific map by comparing said cursor geographic coordinates with map polygons for maps located in said correct proximity location; and retrieving stored e-documents relating to said land described by said specific map.

62. A computer readable storage medium that stores an Internet accessible tool, said Internet accessible tool containing instructions for a computer system to perform processes to locate a boundary on a plurality of digital maps and images, said processes comprising:

obtaining a first digital map with said boundary overlaid on said first digital map, wherein said boundary is comprised of a plurality of boundary points delineating screen coordinates of said boundary on said first digital map;

analyzing said screen coordinates of said plurality of boundary points;

generating geographic coordinates for said plurality of boundary points in response to analysis of said screen coordinates;

generating lines between said geographic coordinates of said plurality of boundary points to produce boundary lines of said boundary;

displaying said boundary lines;

displaying said plurality of boundary points and said boundary lines at corresponding geographic locations on additional digital maps and images;

toggling between said additional digital maps and images to view locations of said plurality of boundary points and said boundary lines on said additional digital maps and images; and adjusting said locations of said plurality of boundary points, as needed, to accurately locate said plurality of boundary points on said first digital map and said additional digital maps and images.

63. A computer readable storage medium that stores an Internet accessible tool, said Internet accessible tool containing instructions for a computer system to perform processes to locate a boundary point on a plurality of digital maps and images, said processes comprising:

obtaining a first digital map with said boundary point overlaid on said first digital map, wherein said boundary point has screen coordinates on said first digital map;

analyzing said screen coordinates of said boundary point;

generating geographic coordinates for said boundary point in response to analysis of said screen coordinates;

displaying said boundary point at a corresponding geographic location on additional digital maps and images;

toggling between said additional digital maps and images to view the location of said boundary point on said additional digital maps and images; and adjusting said location of said boundary point, as needed, to accurately locate said boundary point on said first digital map and said additional digital maps and images.

64. A computer readable storage medium that stores an Internet accessible tool, said Internet accessible tool containing instructions for a computer system to perform processes to generate a boundary on a digital map using a cursor, said processes comprising:

generating an initial boundary point by activation of said cursor at an initial location on said digital map by clicking a mouse;

analyzing screen coordinates of said initial boundary point;

generating geographic coordinates for said initial boundary point in response to analysis of said screen coordinates;

drawing said boundary from said initial boundary point using a drawing tool;

analyzing screen coordinates of said boundary drawn by said drawing tool;

generating additional boundary points for said boundary in response to analysis of said boundary drawn by said drawing tool;

analyzing screen coordinates of said additional boundary points;

generating geographic coordinates for said additional boundary points; and generating boundary lines between said geographic coordinates of said initial and additional boundary points.

65. A computer readable storage medium that stores an Internet accessible tool, said Internet accessible tool containing instructions for a computer system to perform processes to generate a boundary on a digital map using a cursor, said processes comprising:

generating an initial boundary point using said Internet accessible tool by activation of said cursor at an initial location on said digital map by clicking a mouse;

analyzing screen coordinates of said initial boundary point;

generating geographic coordinates for said initial boundary point in response to analysis of said screen coordinates;

generating additional boundary points by activation of said cursor at additional locations on said digital map by clicking a mouse;

analyzing screen coordinates of said additional boundary points;

generating geographic coordinates for said additional boundary points; and generating lines between said geographic coordinates of said initial and additional boundary points.

66. A computer readable storage medium that stores an Internet accessible tool, said Internet accessible tool containing instructions for a computer system to perform processes to generate a boundary on a digital map using geographic coordinates of a plurality of corner points of said boundary, said processes comprising:

generating a geographic coordinates table;

entering said geographic coordinates of said plurality of corner points of said boundary in said geographic coordinates table;

locating coordinates of said plurality of corner points of said boundary on said digital map by reference to an origin point, said coordinates corresponding to adjacent geographic coordinates; and generating lines between said coordinates to display said boundary on said digital map.

* * * * *